（12） United States Patent
Yaron

(10) Patent No.: US 10,864,127 B1
(45) Date of Patent: Dec. 15, 2020

(54) SYSTEM AND METHOD FOR CORRECTING STEERING OF A VEHICLE

(71) Applicant: Pride Mobility Products Corporation, Exeter, PA (US)

(72) Inventor: John Yaron, Duryea, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 161 days.

(21) Appl. No.: 15/975,719

(22) Filed: May 9, 2018

Related U.S. Application Data

(60) Provisional application No. 62/503,656, filed on May 9, 2017.

(51) Int. Cl.
*A61G 5/10* (2006.01)
*B62D 11/04* (2006.01)
*B62D 11/00* (2006.01)
*A61G 5/04* (2013.01)
*B62D 6/00* (2006.01)

(52) U.S. Cl.
CPC ............ *A61G 5/1051* (2016.11); *A61G 5/042* (2013.01); *A61G 5/045* (2013.01); *B62D 6/005* (2013.01); *B62D 11/003* (2013.01); *B62D 11/04* (2013.01); *A61G 2203/10* (2013.01); *A61G 2203/30* (2013.01)

(58) Field of Classification Search
CPC ........... B62D 6/05; B62D 11/04; A61G 5/042
See application file for complete search history.

(56) References Cited

U.S. PATENT DOCUMENTS

| 4,415,049 | A | 11/1983 | Wereb |
| 4,471,273 | A | 9/1984 | Melocik et al. |
| 4,511,825 | A | 4/1985 | Klimo |
| 4,549,624 | A | 10/1985 | Doman |
| 4,556,940 | A | 12/1985 | Katoo et al. |

(Continued)

FOREIGN PATENT DOCUMENTS

| AU | 199894880 B2 | 4/1999 |
| AU | 1999055959 B2 | 5/2000 |

(Continued)

OTHER PUBLICATIONS

J. B. Shung, et al.; Feedback Control and Simulation of a Wheelchair; Journal of Dynamic Systems, Measurement, and Control, Jun. 1983, Issue 2, vol. 105, pp. 96-100.

(Continued)

*Primary Examiner* — Kevin Hurley
(74) *Attorney, Agent, or Firm* — Morgan, Lewis & Bockius LLP

(57) ABSTRACT

In one embodiment, a wheelchair includes a drive wheel, a motor coupled to the drive wheel, and a user input device. The motor, in one embodiment, is configured to rotate the drive wheel. The user input device may be configured to send a signal for controlling a motor parameter. The wheelchair, in one embodiment, includes a caster wheel and a castor sensor configured to sense a caster angle. In one embodiment, a controller is configured to receive the signal for controlling the motor parameter and a signal from the caster sensor and to determine a first turn rate parameter of the wheelchair based upon the received signal from each of the input device and the caster sensor.

27 Claims, 13 Drawing Sheets

(56) References Cited

U.S. PATENT DOCUMENTS

| | | |
|---|---|---|
| 4,634,941 A | 1/1987 | Klimo |
| 4,823,900 A | 4/1989 | Farnam |
| 4,953,645 A | 9/1990 | Korber et al. |
| 5,022,476 A | 6/1991 | Weege |
| 5,065,612 A | 11/1991 | Ooka et al. |
| 5,208,521 A | 5/1993 | Aoyama |
| 5,219,212 A | 6/1993 | Shimada et al. |
| 5,234,066 A | 8/1993 | Ahsing et al. |
| 5,253,724 A | 10/1993 | Prior |
| 5,270,959 A | 12/1993 | Matsuzaki et al. |
| 5,278,424 A | 1/1994 | Kagawa |
| 5,307,888 A | 5/1994 | Urvoy |
| 5,366,036 A | 11/1994 | Perry |
| 5,426,970 A | 6/1995 | Florida |
| 5,512,904 A | 4/1996 | Bennett |
| 5,531,030 A | 7/1996 | Dale, Jr. |
| 5,699,256 A | 12/1997 | Shibuya et al. |
| 5,701,965 A | 12/1997 | Kamen et al. |
| 5,795,988 A | 8/1998 | Lo et al. |
| 6,202,773 B1 | 3/2001 | Richey et al. |
| 6,283,237 B1 * | 9/2001 | Muller .................. B62D 12/00 180/235 |
| 6,615,937 B2 | 9/2003 | Richey, II et al. |
| 6,749,034 B2 | 6/2004 | Vogel et al. |
| 6,877,572 B2 | 4/2005 | Vogel et al. |
| 7,014,000 B2 | 3/2006 | Kummer et al. |
| 7,083,012 B2 | 8/2006 | Vogel et al. |
| 7,090,041 B2 | 8/2006 | Vogel et al. |
| 7,195,253 B2 | 3/2007 | Vogel et al. |
| 7,273,115 B2 | 9/2007 | Kummer et al. |
| 7,360,792 B2 | 4/2008 | Turturiello et al. |
| 7,407,024 B2 | 8/2008 | Vogel et al. |
| 7,464,785 B2 * | 12/2008 | Spark ....................... B60T 8/24 180/236 |
| 7,828,092 B2 | 11/2010 | Vogel et al. |
| 7,974,753 B2 | 7/2011 | Kuo et al. |
| 8,267,206 B2 | 9/2012 | Vogel et al. |
| 8,315,770 B2 | 11/2012 | Strothmann |
| 8,452,508 B2 | 5/2013 | Frolik et al. |
| 8,452,511 B2 | 5/2013 | Strothmann et al. |
| 8,534,679 B2 | 9/2013 | Goertzen et al. |
| 9,266,392 B2 | 2/2016 | Brondum |
| 9,322,658 B2 | 4/2016 | Hannah et al. |
| 9,364,377 B2 | 6/2016 | Goertzen et al. |
| 2001/0006125 A1 | 7/2001 | Richey et al. |
| 2003/0010545 A1 * | 1/2003 | Takeuchi ............ B60L 15/2036 180/6.28 |
| 2005/0236196 A1 | 10/2005 | Runkles et al. |
| 2006/0066268 A1 | 3/2006 | Nora et al. |
| 2007/0051541 A1 | 9/2007 | Voto et al. |
| 2016/0193095 A1 | 7/2016 | Roussy et al. |
| 2016/0288568 A1 | 10/2016 | Brondum |
| 2016/0370248 A1 | 12/2016 | Stefanov et al. |
| 2017/0122739 A1 | 5/2017 | Kurashina et al. |
| 2017/0143566 A1 | 5/2017 | Elku et al. |

FOREIGN PATENT DOCUMENTS

| | | | |
|---|---|---|---|
| AU | 2002014631 | B2 | 5/2002 |
| AU | 200057882 | B2 | 8/2002 |
| AU | 2002236759 | B2 | 8/2002 |
| AU | 2002306959 | B2 | 10/2002 |
| AU | 2002341765 | B2 | 4/2003 |
| AU | 2003225926 | B2 | 10/2003 |
| AU | 2004232015 | B2 | 11/2004 |
| AU | 2004206981 | B2 | 3/2005 |
| AU | 2004282827 | B2 | 4/2005 |
| AU | 2004307421 | B2 | 5/2005 |
| AU | 2005265201 | B2 | 1/2006 |
| AU | 200236913 | B2 | 2/2006 |
| AU | 2006215401 | B2 | 8/2006 |
| AU | 2006239071 | B2 | 11/2006 |
| AU | 2006284687 | B2 | 3/2007 |
| AU | 2006284741 | B2 | 3/2007 |
| AU | 2006284747 | B2 | 3/2007 |
| AU | 2006284749 | B2 | 3/2007 |
| AU | 2006284753 | B2 | 3/2007 |
| AU | 2008214045 | B2 | 2/2008 |
| AU | 2007297814 | B2 | 3/2008 |
| AU | 2008203294 | B2 | 8/2008 |
| AU | 2008242596 | C1 | 10/2008 |
| AU | 2009230795 | B2 | 11/2009 |
| AU | 2009268484 | B2 | 1/2010 |
| AU | 2009279526 | B2 | 2/2010 |
| AU | 2010235847 | B2 | 11/2010 |
| AU | 2010304706 | B2 | 4/2011 |
| AU | 2011215991 | B2 | 8/2011 |
| AU | 2011268382 | B2 | 12/2011 |
| AU | 2011270765 | B2 | 12/2011 |
| AU | 2011276670 | B2 | 1/2012 |
| AU | 2011326189 | B2 | 5/2012 |
| AU | 2012203342 | B2 | 6/2012 |
| AU | 2012216791 | B2 | 10/2012 |
| AU | 2012258841 | B2 | 11/2012 |
| AU | 2012296734 | B2 | 2/2013 |
| AU | 2012213930 | B2 | 3/2013 |
| AU | 2012216281 | | 3/2013 |
| AU | 2008254446 | B2 | 4/2014 |
| AU | 2012318851 | | 5/2014 |
| AU | 2010303354 | B2 | 6/2014 |
| AU | 2014202550 | | 6/2014 |
| AU | 2012356022 | B2 | 7/2014 |
| AU | 2014203773 | | 7/2014 |
| AU | 2013229908 | | 10/2014 |
| AU | 2014224138 | | 10/2014 |
| AU | 2014205643 | B2 | 7/2015 |
| AU | 2013221283 | B2 | 8/2015 |
| AU | 2014238165 | | 10/2015 |
| AU | 2015264299 | | 12/2016 |
| AU | 2012395506 | B2 | 4/2017 |
| AU | 2016201588 | | 12/2017 |
| AU | 2012394174 | B2 | 2/2018 |
| DE | 3724161 | | 12/1988 |
| DE | 4231821 | | 3/1994 |
| DE | 19821020 | | 11/1998 |
| DE | 19748201 | | 3/1999 |
| DE | 19748877 | | 5/1999 |
| DE | 19732273 | | 7/1999 |
| DE | 19949351 | | 7/2001 |
| DE | 10318929 | | 8/2004 |
| DE | 202011102900 | | 10/2011 |
| DE | 202011104720 | | 11/2011 |
| DE | 102011084236 | | 4/2013 |
| DE | 102013208610 | | 11/2014 |
| DE | 102013223985 | | 5/2015 |
| DE | 202015000207 | | 3/2016 |
| DE | 102015202924 | | 5/2016 |
| EP | 324101 | | 7/1989 |
| EP | 0933282 | | 10/1997 |
| EP | 0850822 | | 11/1997 |
| EP | 0859224 | | 1/1998 |
| EP | 0861649 | | 9/1998 |
| EP | 1190693 | | 7/2001 |
| EP | 1200285 | A1 | 5/2002 |
| EP | 1342994 | | 3/2003 |
| EP | 1493418 | | 6/2004 |
| EP | 1502563 | | 7/2004 |
| EP | 1479362 | | 11/2004 |
| EP | 1541965 | | 6/2005 |
| EP | 1591092 | | 11/2005 |
| EP | 1591093 | | 11/2005 |
| EP | 1591094 | | 11/2005 |
| EP | 1762464 | | 8/2006 |
| EP | 1972314 | | 3/2007 |
| EP | 1972486 | | 9/2008 |
| EP | 1278651 | A2 | 3/2009 |
| EP | 2248500 | | 3/2010 |
| EP | 2295015 | | 9/2010 |
| EP | 2368746 | | 3/2011 |
| EP | 2340799 | | 7/2011 |
| EP | 2666453 | | 12/2011 |
| EP | 2540554 | | 1/2013 |
| EP | 2543537 | | 1/2013 |

(56) References Cited

FOREIGN PATENT DOCUMENTS

| | | |
|---|---|---|
| EP | 2543537 A1 | 1/2013 |
| EP | 2134566 B1 | 3/2013 |
| EP | 2848905 | 3/2015 |
| EP | 2616254 B1 | 6/2015 |
| EP | 2883525 | 6/2015 |
| EP | 3000456 A1 | 3/2016 |
| EP | 3017798 | 5/2016 |
| EP | 3053563 | 8/2016 |
| EP | 1864082 B1 | 10/2016 |
| EP | 3138701 A1 | 3/2017 |
| EP | 3138702 A1 | 3/2017 |
| FR | 2905313 | 3/2008 |
| FR | 2960421 | 12/2011 |
| GB | 1092162 | 11/1967 |
| GB | 1103621 | 2/1968 |
| GB | 2043554 | 10/1980 |
| GB | 2218517 | 3/1988 |
| GB | 2342903 | 12/1998 |
| GB | 2352522 | 5/1999 |
| GB | 2486179 | 6/2012 |
| JP | 10314234 | 12/1998 |
| WO | 94/20235 | 9/1994 |
| WO | 9838958 | 9/1998 |
| WO | 0025718 | 5/2000 |
| WO | 0028931 | 5/2000 |
| WO | 0054719 | 9/2000 |
| WO | 0102920 | 1/2001 |
| WO | 0108922 | 2/2001 |
| WO | 0230730 | 4/2002 |
| WO | 02055322 | 7/2002 |
| WO | 02066281 | 8/2002 |
| WO | 2005049357 | 6/2005 |
| WO | 2006012036 | 2/2006 |
| WO | 2006089398 | 8/2006 |
| WO | 2007027852 | 3/2007 |
| WO | 2008065322 | 6/2008 |
| WO | 2008144082 | 11/2008 |
| WO | 2009137304 | 11/2009 |
| WO | 2011044405 | 4/2011 |
| WO | 2012144911 | 10/2012 |
| WO | 2013093874 | 12/2012 |
| WO | 2013166593 | 11/2013 |
| WO | 2014011992 | 1/2014 |
| WO | 2014045859 | 3/2014 |
| WO | 2014133223 A1 | 9/2014 |
| WO | 2014148723 A1 | 9/2014 |
| WO | 2014187864 A1 | 11/2014 |
| WO | 2015146509 | 1/2015 |
| WO | 2015038008 | 3/2015 |
| WO | 2015058059 | 5/2015 |
| WO | 2015063765 | 5/2015 |
| WO | 2015154046 | 10/2015 |
| WO | 2016031262 | 3/2016 |
| WO | 2016035726 | 10/2016 |
| WO | 2016160344 A1 | 10/2016 |

OTHER PUBLICATIONS

J. B. Shung, et al.; Dynamic Modeling of a Wheelchair on a Slope; Journal of Dynamic Systems, Measurement, and Control, Jun. 1983, Issue 2, vol. 105, pp. 101-106.

Barshan et al., "An inertial navigation system for a mobile robot", Intelligent Robots and Systems '93, vol. 3, Jul. 26, 1993, pp. 2243-2248.

Borenstein, et al., "Where am I? Sensors and Methods for Mobile Robot Positioning", The University of Michigan, pp. 1, 2, 4-11, 31-64, Apr. 1996.

Bradley, "Transducers for Motion Control", Motion Control for Intelligent Automation, Oct. 27-29, 1992, Perugia, Italy, pp. 48-56.

Collins, Timothy J. and James J. Kauzlarich, "Directional instability of rear caster wheelchairs", Journal of Rehabilitation Research and Development, vol. 25, No. 3, pp. 1-18 dated Summer 1988.

Cooper, R.A. "Intelligent Control of Power Wheelchairs", IEEE Engineering in Medicine & Biology Magazine, vol. 14, No. 4, Jul./Aug. 1995, pp. 423-430, NY, U.S.

Moore, James W., Wheelchair Directional Control, Digital and Analog Simulation, IEEE Engineering in Medicine and Biology 10th International Conference dated 1988.

Pressler, et al., "Maid: Mobility Assistance for Elderly and Disabled People", IEEE, No. 0-7803-4503-7198, pp. 2493-2498 (1998).

Strobel "Navigation in Partially Unknown, Narrow, Cluttered Space", ,Proceedings of the 1999 IEEE, Int'l Conference on Robotics & Automation, Detroit, MI—May 1999, pp. 29-34.

Von Der Hardt, et al., "The dead reckoning localization system of the wheeled mobile robot", Romane' Multisensor Fusion and Integration of Intelligent Systems Dec. 8, 1996, New York, NY, USA, IEEE, pp. 603-610.

Select pages (pp. 315-323) from the book "Rehabilitation Engineering Applied to Mobility and Manipulation", Rory A. Cooper, published 1995 by Taylor & Francis Group, LLC, ISBN-13:978-0750303439.

\* cited by examiner

SYSTEM AND METHOD FOR CORRECTING STEERING OF A VEHICLE

CROSS-REFERENCE TO RELATED APPLICATIONS

This application claims the benefit of U.S. Provisional Patent Application No. 62/503,656 filed May 9, 2017 entitled "System and Method for Correcting Steering of a Vehicle", which is incorporated by reference herein in its entirety.

BRIEF SUMMARY OF THE INVENTION

In one embodiment, a wheelchair includes a drive wheel, a motor coupled to the drive wheel, and a user input device. The motor, in one embodiment, is configured to rotate the drive wheel. The user input device may be configured to send a signal for controlling a motor parameter. The wheelchair, in one embodiment, includes a caster wheel and a castor sensor configured to sense a caster angle. In one embodiment, a controller is configured to receive the signal for controlling the motor parameter and a signal from the caster sensor and to determine a first turn rate parameter of the wheelchair based upon the received signal from each of the input device and the caster sensor.

In one embodiment, the motor parameter includes at least one of a motor current and a motor voltage. The controller may be configured to determine a second turn rate parameter of the wheelchair that is different from the first turn rate parameter of the wheelchair. The second turn rate parameter may be determined based upon a lateral acceleration parameter of the wheelchair and the received signal from the input device. The controller may be configured to determine a third turn rate parameter of the wheelchair that is different from at least one of the first turn rate parameter and the second turn rate parameter. The third turn rate parameter may be based upon the average of the first turn rate parameter and the second turn rate parameter. The first turn rate parameter may be greater than a gyroscope-based turn rate parameter of the wheelchair. The second turn rate may be less than a gyroscope-based turn rate parameter of the wheelchair. The drive wheel may comprise a plurality of drive wheels including a left drive wheel and a right drive wheel. The motor may comprise a plurality of motors including a left motor coupled to the left drive wheel and a right motor coupled to the right drive wheel.

In one embodiment, the signal for controlling the motor parameter sent by the input device is a first signal for controlling a left motor parameter. The input device may be configured to send a second signal for controlling a right motor parameter. The controller may be configured to receive the first signal and the second signal to determine the first turn rate parameter of the wheelchair based upon the received signal from each of the input device and the caster sensor. The controller may be configured to send a signal to at least one of the left motor and the right motor to maintain a selected trajectory of the wheelchair if the difference between a commanded yaw rate signal and a computed yaw rate signal exceeds a selected threshold. The computed yaw rate signal may be determined from at least one of the first turn rate parameter, the second turn rate parameter, and the third turn rate parameter. The commanded yaw rate signal may be determined from at least one of the left motor parameter, the right motor parameter, and a width between the left drive wheel and the right drive wheel. The signal sent by the controller may be configured to adjust at least one of the left motor parameter and the right motor parameter such that the commanded yaw rate and the measured yaw rate signal are within a selected range of each other. The signal sent by the controller may be configured to adjust at least one of the left motor parameter and the right motor parameter by an amount proportional to at least one of a wheelchair velocity.

In one embodiment, the signal sent by the controller may be configured to increase one of the left motor parameter and the right motor parameter and the controller may be configured to send a second signal configured to decrease the other of the left motor and the right motor parameter. The signal sent by the controller may be configured to adjust at least one of the left motor parameter and the right motor parameter. A wheelchair velocity along the selected trajectory may remain within a selected range when the at least one of the left motor parameter and the right motor parameter may be adjusted. The controller may be configured to determine a yaw rate differential by comparing a commanded yaw rate signal to a computed yaw rate signal and to transmit a signal to one of the left motor and the right motor based on a comparison between the yaw rate differential and a selected threshold. The signal may be processed to adjust a rotation speed of one of the left motor and the right motor. In one embodiment, an inside wheel includes one of the left drive wheel and the right drive wheel and an outside wheel includes the other of the left drive wheel and the right drive wheel. The controller may be configured to transmit the signal to one of the inside wheel and the outside wheel. The signal may be processed to reduce a velocity of one of the inside wheel and the outside wheel to compensate for slippage when the wheelchair is turning. The signal transmitted from the controller may be configured to reduce the velocity of one of the inside wheel and the outside wheel by an amount proportional to the yaw rate differential.

The velocity of one of the inside wheel and the outside wheel is reduced by an amount proportional to the computed yaw rate signal. The controller may be configured to transmit a first signal to at least one of the left motor and the right motor to maintain a selected trajectory of the wheelchair when a yaw rate is within a first range. The controller may be configured to transmit a second signal to at least one of the left motor and the right motor when the yaw rate is within a second range of yaw rates. The first range may be lower than the second range. The controller may be configured to transition between transmitting the first signal and transmitting the second signal starting at a yaw rate of about twenty degrees per second to a yaw rate of about sixty degrees per second. The yaw rate may include at least one of a commanded yaw rate, a measured yaw rate, and a yaw rate differential. In one embodiment, a sensitivity of the controller to the signal from user input device decreases as a rotational speed of one of the drive wheel motor increases.

BRIEF DESCRIPTION OF THE SEVERAL VIEWS OF THE DRAWINGS

The following detailed description of embodiments of the system and method for correcting steering of a vehicle will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE INVENTION

Figure 1:
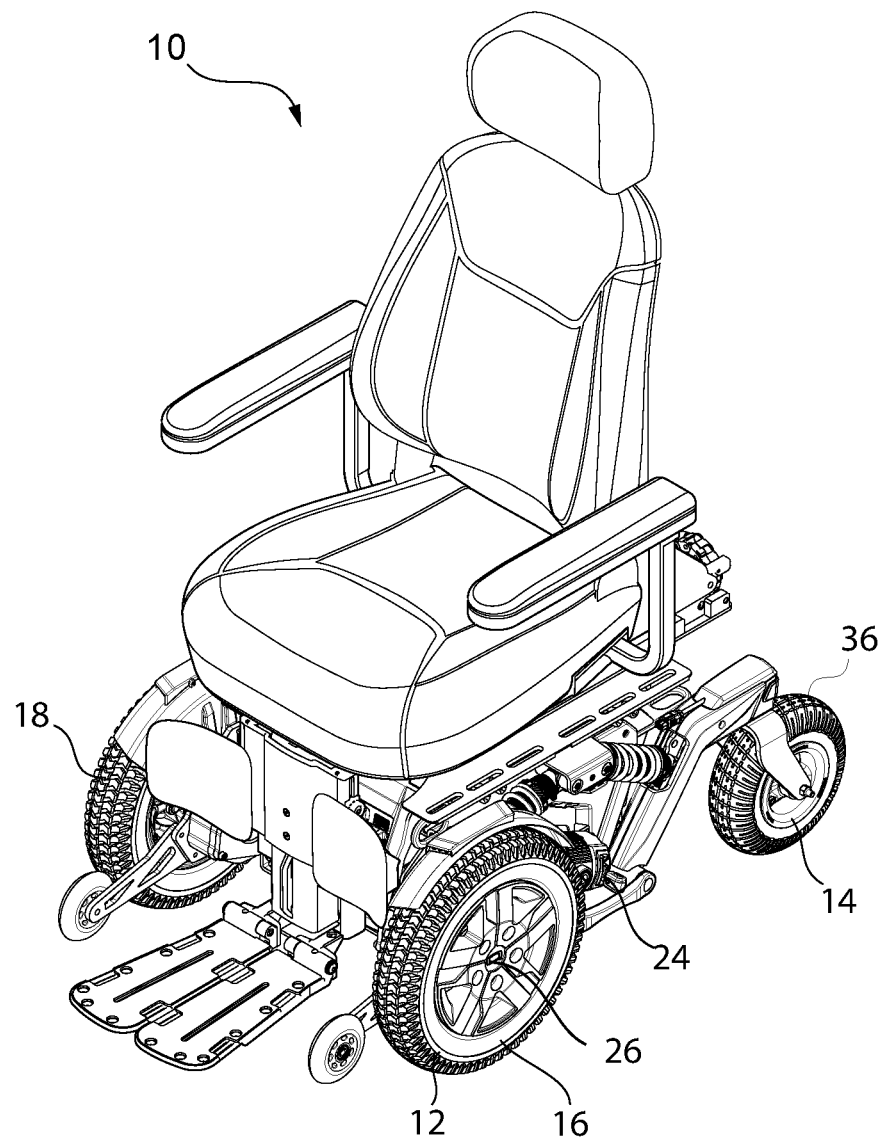
FIG. 1 is a front, side perspective view of a wheelchair in accordance with an exemplary embodiment of the present invention.
Figure 2:
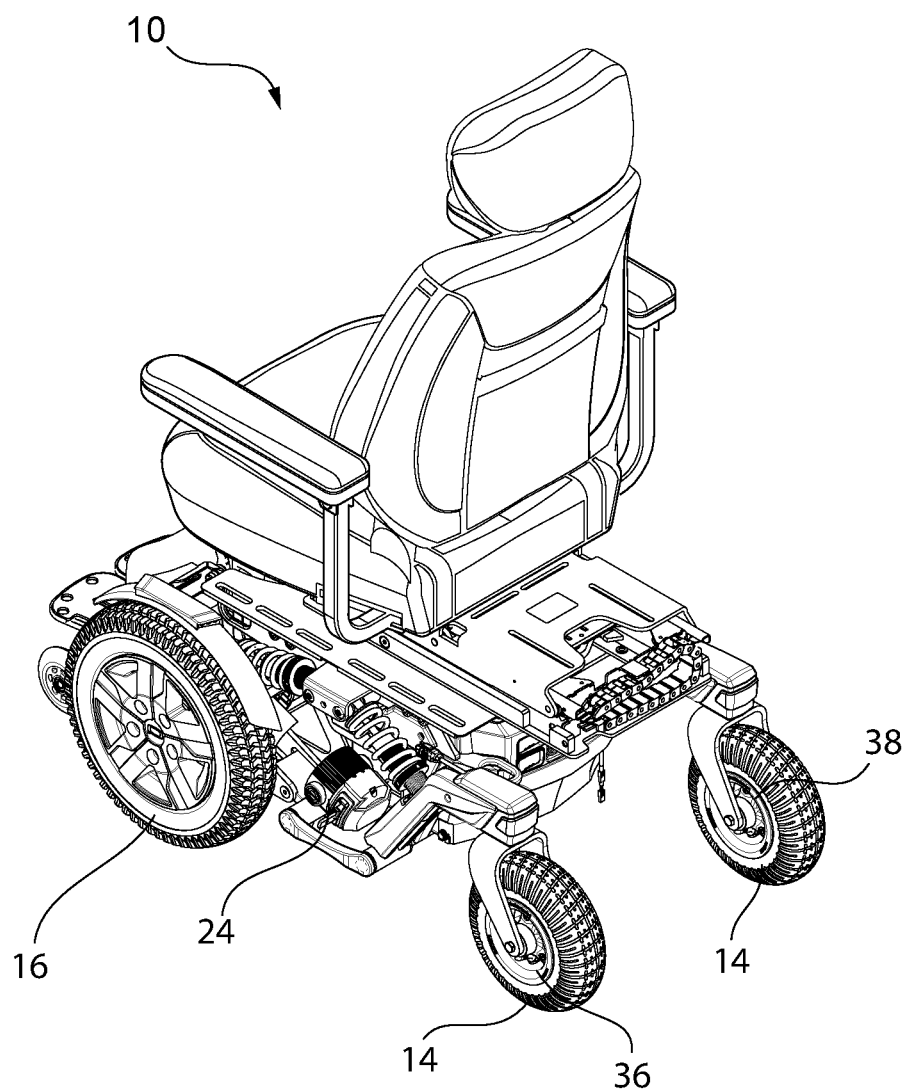
FIG. 2 is a rear, side perspective view one embodiment of the wheelchair of FIG. 1.
Figure 3:
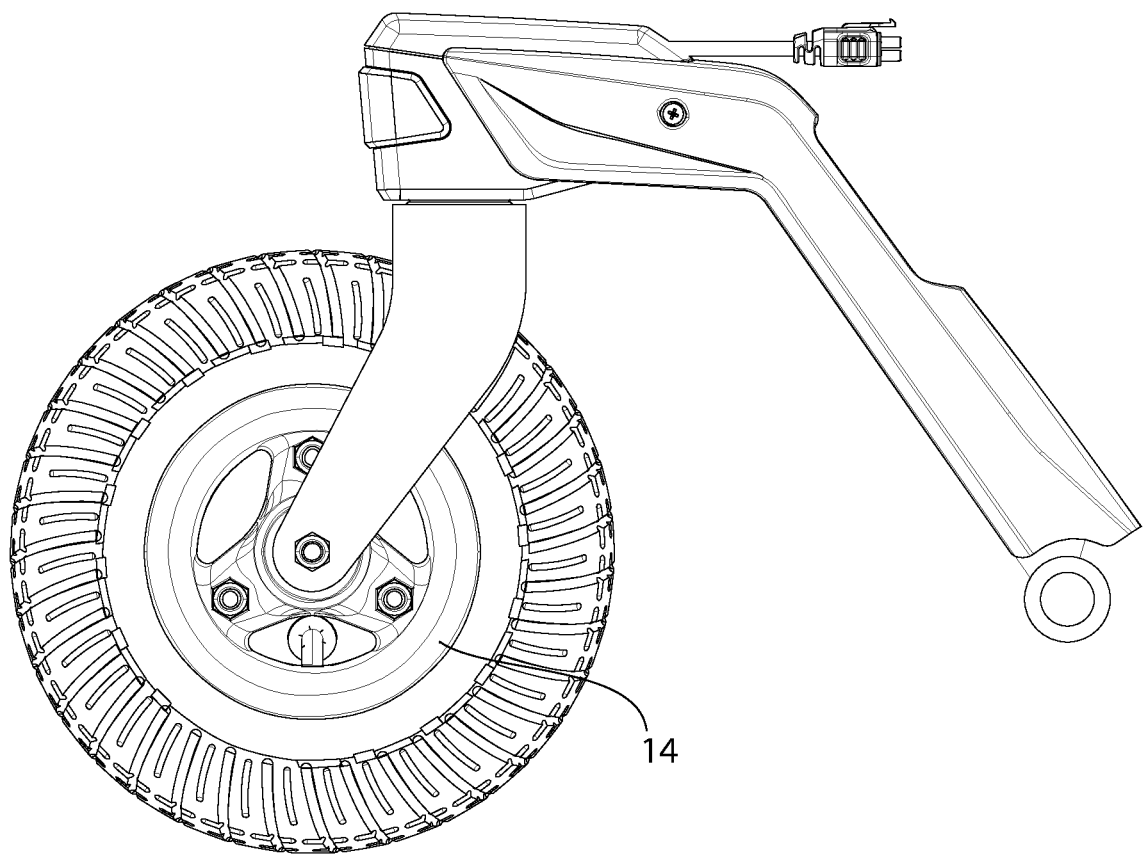
FIG. 3 is an isolated, side elevation view of one embodiment of a caster wheel assembly of FIG. 1.

Referring to the drawings in detail, wherein like reference numerals indicate like elements throughout, there is shown in FIGS. 1-11 a wheelchair, generally designated 10, and/or a stability control system in accordance with an exemplary embodiment of the present invention.

In one embodiment, the wheelchair 10 includes a means for advancing the wheelchair in a desired direction (e.g., in a straight line, through a turn). In one embodiment, the means for advancing the wheelchair 10 includes a system for controlling at least one front wheel assembly 12 and at least one rear wheel assembly 14. In one embodiment, the front wheel assembly 12 and the rear wheel assembly 14 are separated by a wheelchair length L (e.g., a wheelbase length). In one embodiment, the front wheel assembly 12 includes at least one drive wheel and the rear wheel assembly 14 includes at least one caster wheel. In another embodiment, the front wheel assembly 12 includes at least one caster wheel and the rear wheel assembly includes at least one drive wheel.

Figure 4:
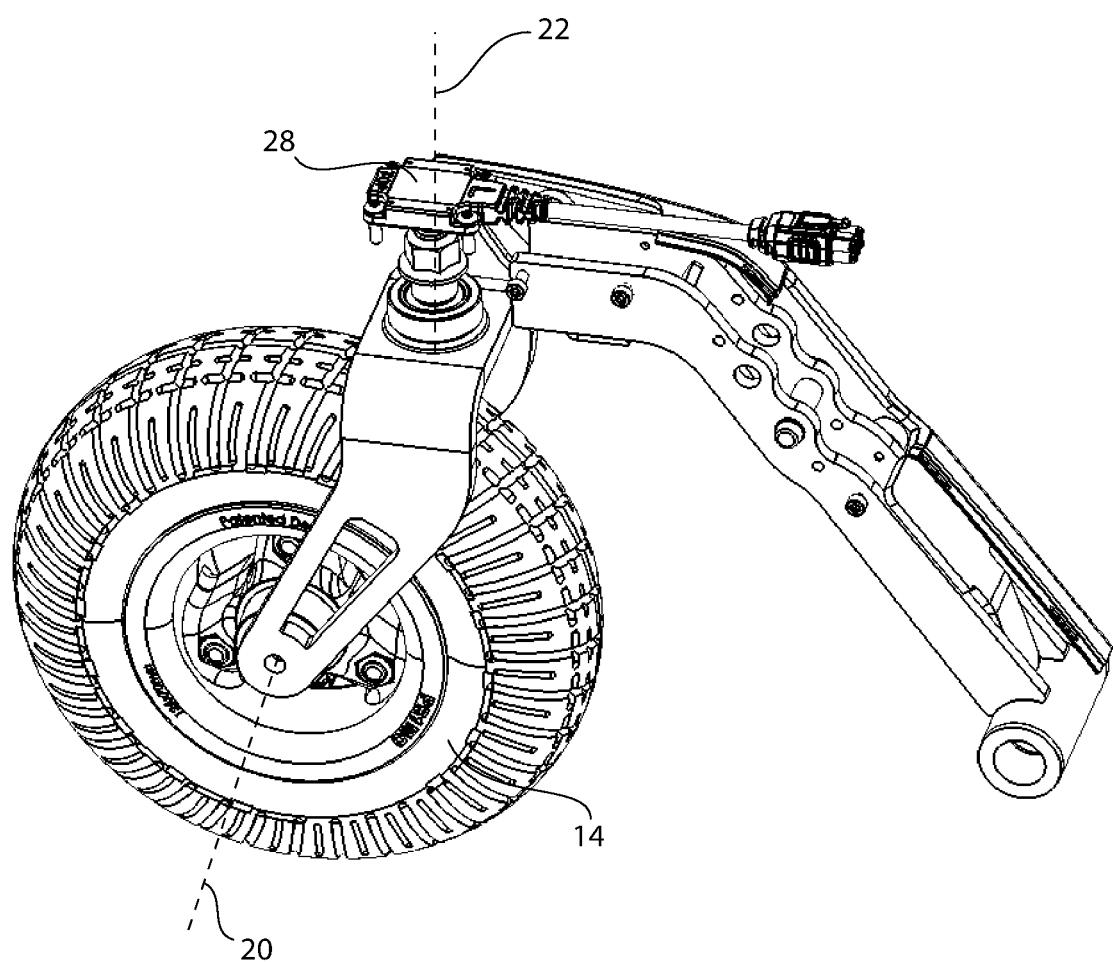
FIG. 4 is a top, side view of one embodiment of the caster wheel assembly of FIG. 3 with selected parts removed.

In one embodiment, the rear wheel assembly 14 may be able to rotate relative to the wheelchair 10 about a first axis 20 and swivel about a second axis 22 (axes best seen in FIG. 4). In one embodiment, the rear wheel assembly 14 swivels during a turning motion of the wheelchair 10. For example, the rear wheel assembly 14 may swivel about the second axis 22 in response to a turning motion of the wheelchair. In one embodiment, the wheelchair 10 includes a caster sensor 28 adapted to detect a caster angle ψ (FIG. 5) of the rear wheel assembly 14 as explained in greater detail below. In one embodiment, the one or more rear wheel assemblies 14 includes a left caster wheel 36 and a right caster wheel 38. Each caster assembly, in one embodiment, operates independently of other caster assemblies of wheelchair 10. In one embodiment, each of the left caster wheel 36 and the right caster wheel 38 include a caster sensor 28. In one embodiment, the left caster wheel 36 and the right caster wheel 38 are separated from each other by a wheelchair width W (e.g., a track width (FIG. 5)). In some embodiments, each caster wheel swivels independent of other caster wheels of wheelchair 10 (e.g., the directional alignment of each caster wheel may vary). In one embodiment, the caster angle ψ from one of the left caster wheel 36 and the right caster wheel 38 is sent to a controller, as explained in greater detail below.

In one embodiment, the drive wheel assembly 12 is a plurality of drive wheels including a left drive wheel 16 and a right drive wheel 18. In one embodiment, a left drive wheel motor 24 is coupled to the left drive wheel 16 and a right drive wheel motor 25 (shown schematically in FIGS. 7A-7B) is coupled to the right drive wheel 18. In one embodiment, the left drive wheel motor 24 and right drive wheel motor 25 are independently controllable such that the wheelchair 10 changes direction of travel when the left drive wheel motor 24 and right drive wheel motor 25 rotate the left drive wheel 16 and right drive wheel 18 at different rotational speeds and/or different rotational directions. In one embodiment, a left gearbox is operatively coupled to the left drive wheel 16 and the left drive wheel motor 24 and a right gearbox is operatively coupled to the right drive wheel 18 and the right drive wheel motor 25.

In one embodiment, a user may select a desired direction of travel of the wheelchair via an input device 40. For example, a user input device may be a joystick, smartphone application, steering wheel, wireless joystick, flashlight, tilting joystick, sip and puff device, or any form of proportional or discrete position control which is implemented physically or virtually. As the user manipulates the input device 40 (e.g., by pushing, rotating, pulling, blowing into, speaking into, virtually generating) the input device 40 sends a signal to a controller 30 (shown schematically in FIG. 7A-7B) which to control a motor parameter of one or more of the left drive wheel motor 24 and the right drive wheel motor 25. For example, the input device 40 may send a signal to the controller 30 related to motor current or motor voltage (e.g., voltage drop across the motor) and the controller 30 may process that signal and send a current signal and/or velocity signal to each of the left drive wheel motor 24 and the right drive wheel motor 25 such that the drive wheel motors 24, 25 rotate to move the wheelchair in the desired direction of travel. In one embodiment, the controller is adapted to determine a motor velocity (e.g., an estimated RPM) based on one or more of voltage, current, and a back EMF constant. In one embodiment, the user input device 40 allows a user to select a direction of travel as well as a demanded velocity of the drive wheels 16, 18. In one embodiment, the controller 30 is adapted to vary the sensitivity of a wheelchair steering system to manipulation of the user input device when at different wheelchair conditions. In one embodiment, the controller 30 is adapted to reduce sensitivity of a wheelchair steering system to manipulation of the user input device when as a wheelchair speed increases. For example, the wheelchair steering system may be more sensitive to lateral joystick movement when traveling at a relatively low speed than when travelling at a relatively higher speed.

In one embodiment, the wheelchair 10 includes a steering control system 29 having a control sensor that is configured to sense one or more parameters of the drive wheel 12. In one embodiment, the sensed drive wheel parameter is related to velocity. In one embodiment, the drive wheel parameter may be related to revolutions per minute (RPMs) or acceleration of the drive wheel 12 as the drive wheel 12 rotates about a drive wheel axis 26. In one embodiment, the control sensor senses power draw from the drive wheel. In one embodiment, the control sensor is a motor sensor (e.g., a motor current sensor, a motor voltage sensor, a motor temperature sensor) and the controller can determine the drive wheel parameter based on the motor current, motor voltage, and/or motor temperature. In another embodiment, the control sensor is a rotary encoder.

In one embodiment, the controller 30 is configured to determine a commanded velocity signal based on manipulation of the user input device 40. For example, the controller may receive a user input device signal when a user moves a joystick to command the wheelchair to move. In one embodiment, the user input device signal indicates a commanded rotational speed of each of the left drive wheel motor 24 and the right drive wheel motor 25. In one embodiment, the controller 30 is adapted to determine the commanded velocity signal based on the commanded rotational speed of each of the left drive wheel motor 24 and the right drive wheel motor 25.

In one embodiment, the steering control system 29 includes a caster sensor 28 (FIG. 4) that senses a parameter related to the caster. For example, the caster sensor 28 may sense a caster angle $\psi$ relative to a selected reference orientation as the caster wheel 14 swivels about the second axis 22. In one embodiment, one or more of the control sensor and the caster sensor 28 is a non-contact position sensor HP58 Hockey Puck™ sensor or a Joral J1939 rotary encoder both of which are sold by Joral, LLC.

Figure 7A:
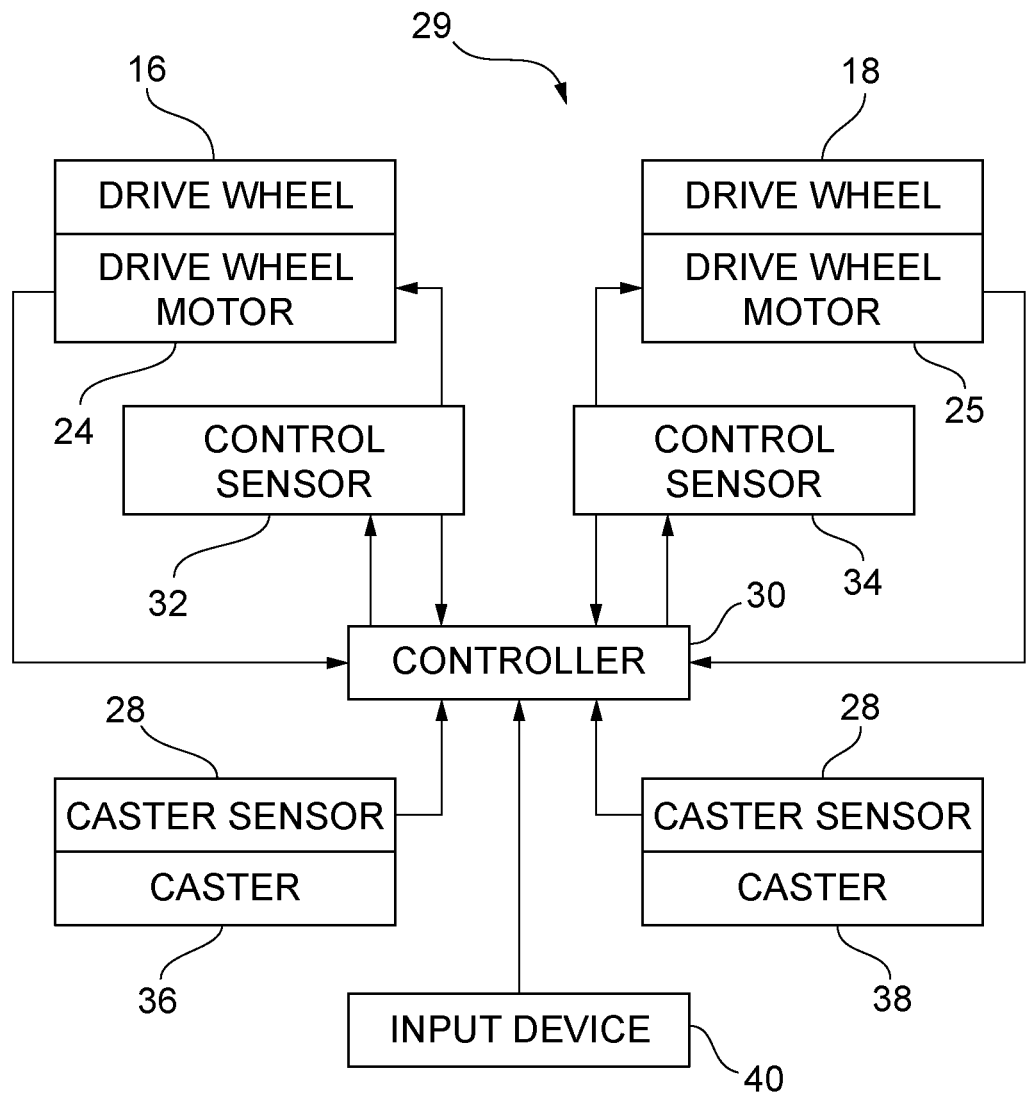
FIGS. 7A-7B are schematic views of components of one embodiment of the wheelchair of FIG. 1.
Figure 7B:
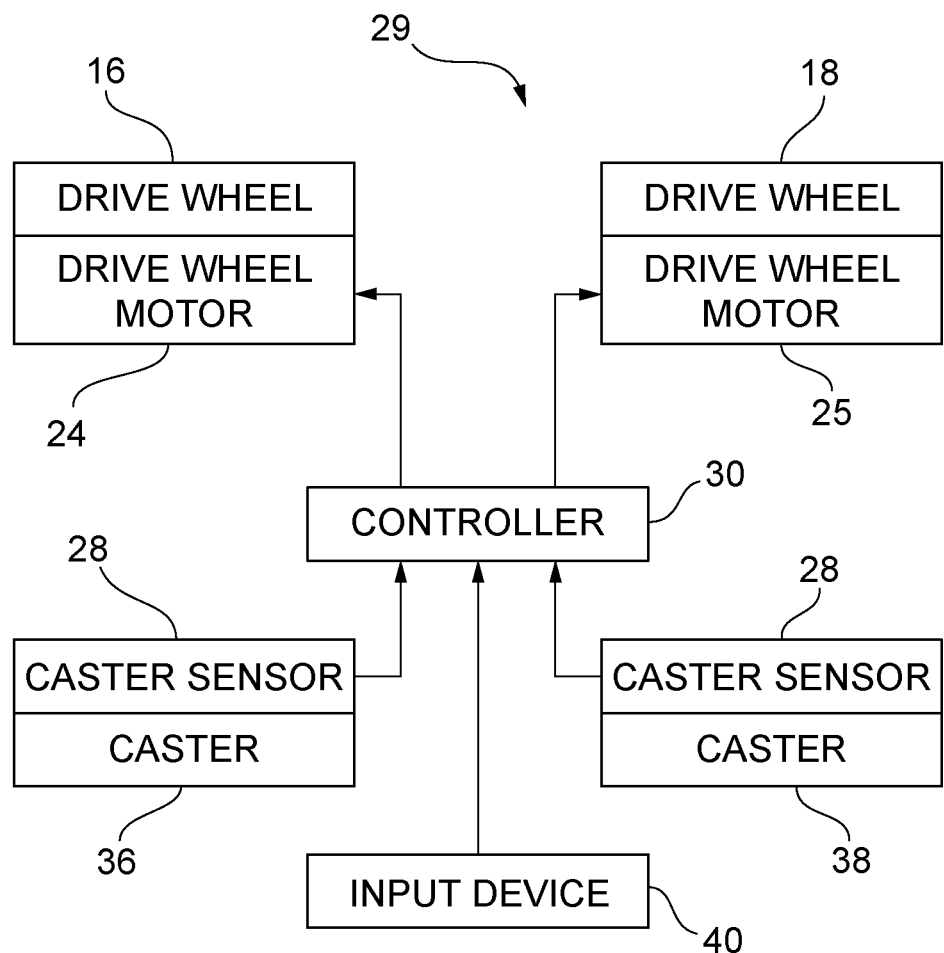
Figure 8:
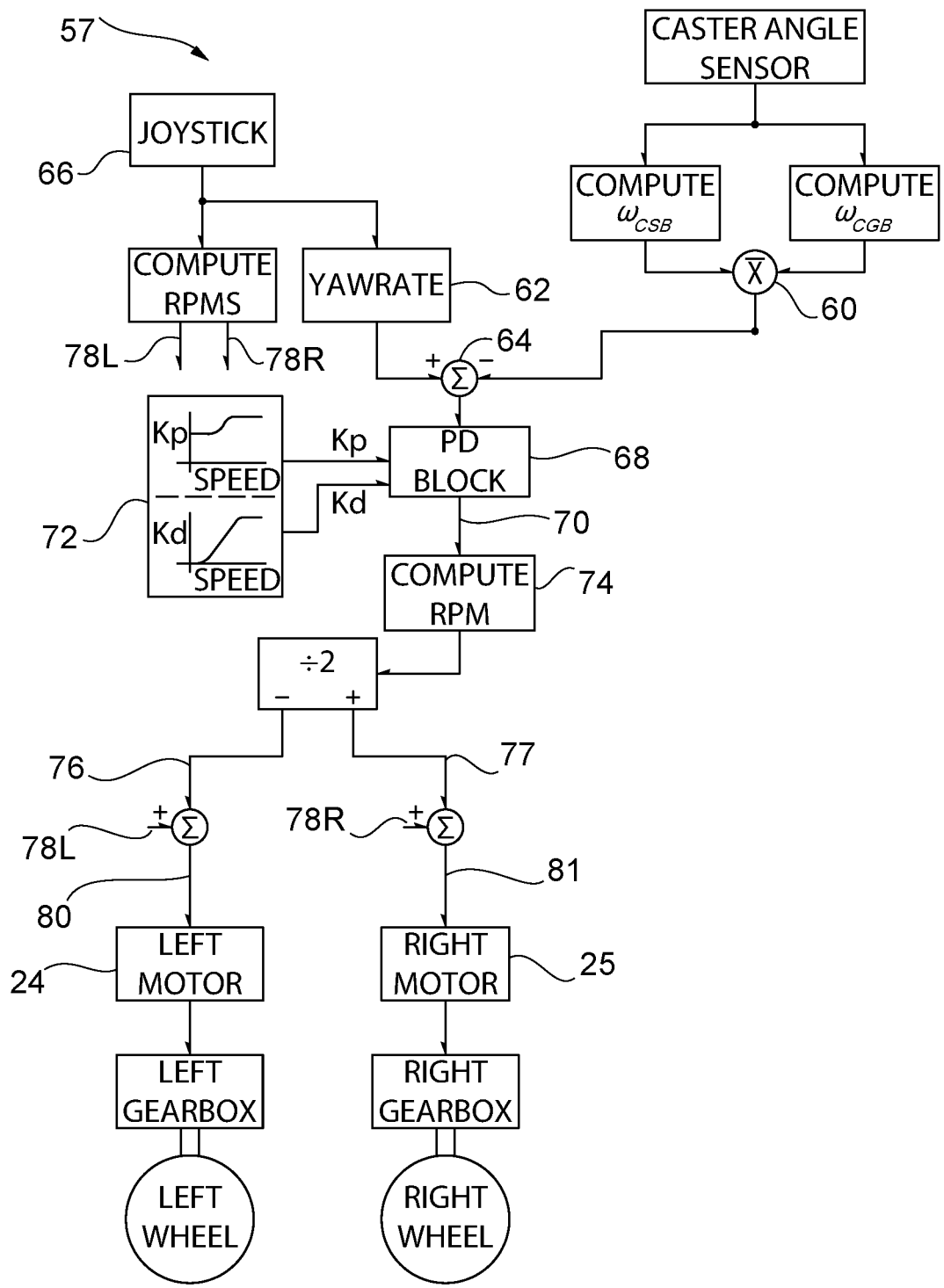
FIG. 8 is a flow chart of a first module in accordance with an exemplary embodiment of the present invention.

The control sensor, in some embodiments, includes a left front control sensor 32 and a right front control sensor 34 as shown in FIG. 7A. In one embodiment, the left front control sensor 32 and right front control sensor 34 are the same or similar type (e.g., rotary encoder, motor current sensor), make, and/or model. In one embodiment, the left front control sensor 32 and right front control sensor 34 are a different type, make and/or model. In one embodiment, a control sensor is configured to sense a parameter of each of the left drive wheel motor 24 and the right drive wheel motor 25. In one embodiment, the control sensors 32, 34 are adapted to sense one or more parameters of the motors 16, 18 (e.g., motor current pull, motor velocity, motor temperature). In one embodiment, the controller 30 may not include a sensor to sense a motor parameter. For example, as shown in FIG. 7B, the user input device 40 may be adapted to send a signal for controlling a motor parameter to the controller 30.

Figure 5:
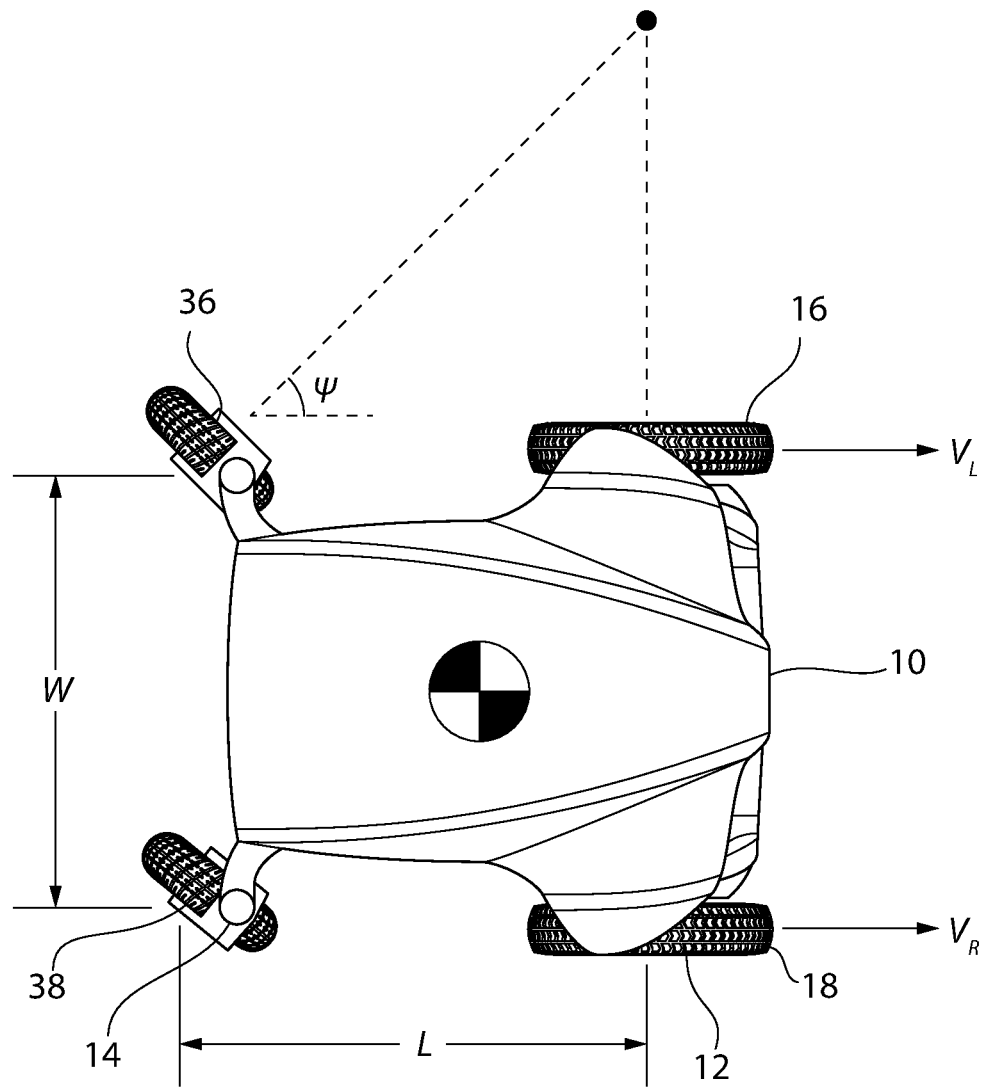
FIG. 5 is a top plan view of a wheelchair in accordance with an exemplary embodiment of the present invention.
Figure 6:
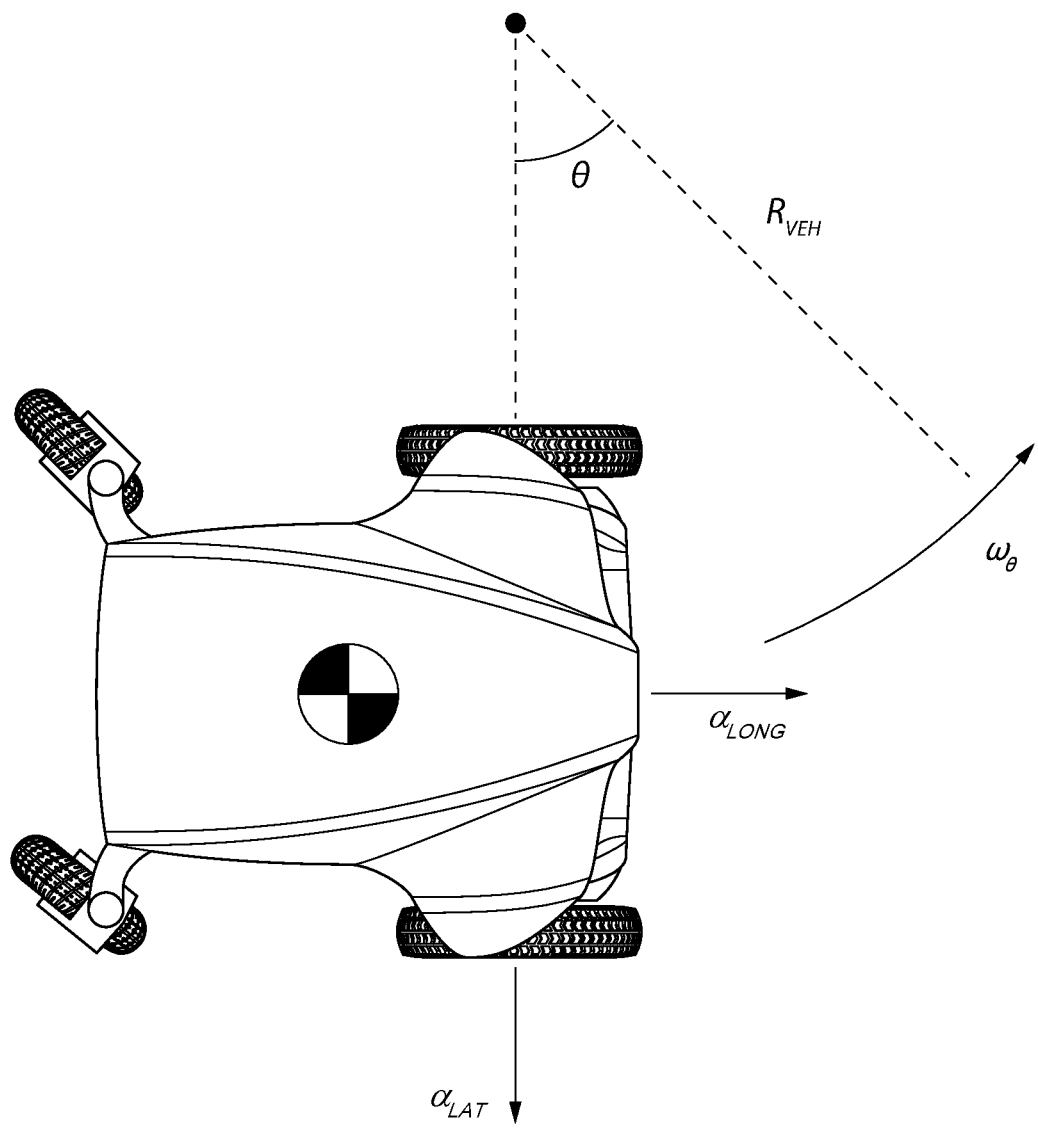
FIG. 6 is a top plan view of one embodiment of the wheelchair of FIG. 5.

Turning to FIGS. 5-7, in one embodiment, the steering control system 29 includes a controller 30 configured to receive a signal indicative of one or more parameters (e.g., velocity, acceleration, turn rate) of the means for advancing the wheelchair and provide a signal to the means for advancing the wheelchair such that the wheelchair remains on the desired path or remains at the desired velocity. In one embodiment, controller 30 is configured to receive a signal from one or more of the control sensors 32, 34 and the caster sensor 28 (best seen in FIG. 5). For example, each of the control sensors 32, 34 and the caster sensor 28 may be connected to the controller 30 by wired (e.g., a cable) or wireless communication methods (e.g., WLAN, Bluetooth, Wi-Fi enabled communication). In one embodiment, the controller 30 determines a parameter of the movement of the wheelchair 10 based on one or more inputs as explained in greater detail below. In one embodiment, determining may include calculating or estimating a value. In one embodiment, the controller is configured to receive a signal for controlling a motor parameter and a signal from the caster sensor to determine a first rate parameter, as explained in greater detail below.

In one embodiment, the controller 30 includes one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein. In one embodiment, the controller is programmed to include wheelchair operational and configuration parameters. For example, the controller may be programmed to include front wheel dimensions (e.g., diameter, width), the wheelchair width W, the wheelchair length L, and the specifications of the left drive wheel motor 24 and right drive wheel motor 25 such that the controller can determine parameters which may or may not be dependent on these dimensions without them having to be provided by a signal when those values are needed.

In one embodiment, the controller 30 is configured to determine a first turn rate parameter or a first turn parameter (e.g., a commanded yaw rate) of the wheelchair 10. In one embodiment the first turn parameter is based upon a commanded wheel velocity. In one embodiment, the first turn parameter is based upon the received signal from the caster sensor(s) 28 and at least one of the signals from the user input device 40 and the control sensors 32, 34. In one embodiment, the controller 30 may determine the first turn parameter based upon signals related to the commanded front left drive wheel velocity $V_L$, the commanded front right drive wheel velocity $V_R$, the wheelchair length L, the wheelchair width W, and the caster angle $\psi$. In one embodiment, the first turn parameter is determined based on commanded wheelchair speed and the caster angle. In one embodiment, the first turn parameter may be a turn rate or yaw rate of the wheelchair 10. In one embodiment, the first turn parameter may be a computed turn rate or yaw rate of the wheelchair. In one embodiment, the first turn parameter may be based upon a computed velocity (e.g., a computed commanded velocity) of the wheelchair 10, an turn radius (e.g., an instantaneous approximated turn radius based on wheel chair geometry and caster angle), and the caster angle $\psi$. In one embodiment, the first turn parameter may be expressed as:

$$\text{First Turn parameter} = \frac{\left|\frac{V_R + V_L}{2}\right|}{\left|L*\tan(\psi) + \frac{W}{2}\right|} * \text{sgn}[\tan(\psi)]$$

In one embodiment, the controller 30 is configured to determine a second turn rate parameter or second turn parameter (e.g., a commanded yaw rate based upon a desired lateral acceleration) of the wheelchair based upon the received signal from the caster sensor(s) 28 and at least one of the signals from the user input device 40 and the control sensors 32, 34. For example, the controller 30 may determine the second turn parameter based upon signals related to the front left drive wheel velocity $V_L$, the front right drive wheel velocity $V_R$, the wheelchair length L, the wheelchair width W, and the caster angle $\psi$. In one embodiment, the second turn parameter may be determined based, at least in part, upon a computed lateral acceleration parameter of the wheelchair 10 and the received signal from at least one of the control sensors 32, 34. In one embodiment, the second turn parameter may be a desired turn rate or yaw rate of the wheelchair 10. In one embodiment, the second turn parameter is different than the first turn parameter. In one embodiment, the second turn parameter is based on a desired lateral acceleration of the wheelchair 10 and the caster angle ψ. The second turn parameter may also be based upon the instantaneous turn radius of wheelchair 10 (e.g., a computed instantaneous turn rate based upon wheel chair geometry and the caster angle). In one embodiment, the second turn parameter may be expressed as:

$$\text{Second Turn parameter} = \sqrt{\frac{\left|\frac{V_R^2 - V_L^2}{2W}\right|}{\left|L*\tan(\psi) + \frac{W}{2}\right|}} * \text{sgn}[\tan(\psi)]$$

In one embodiment, the controller 30 is configured to determine a third turn rate parameter or third turn parameter of the wheelchair 10. In one embodiment the third turn rate parameter is an average of the first turn rate parameter and the second turn rate parameter. In one embodiment, the third turn rate parameter is based upon the caster sensor 28 signal and one of a signal from the user input device 40 and the power draw from drive wheel motor(s) (e.g., voltage and/or current draw from the drive wheel motors). For example, the controller 30 may determine the third turn parameter based upon signals related to the front left drive wheel velocity $V_L$, the front right drive wheel velocity $V_R$, (e.g., the commanded drive wheel velocity based upon the command signal from the input device and voltage and/or current pull of the drive wheel motors) the wheelchair length L, the wheelchair width W, and the caster angle ψ. In one embodiment, the first turn parameter is a computed yaw rate which may be different from an actual yaw rate of the wheelchair 10. In one embodiment, the second turn parameter is a desired yaw rate of the wheelchair 10 based on the desired lateral acceleration of the wheelchair (which may also be different from an actual yaw rate of the wheelchair 10). In one embodiment, the desired lateral acceleration of the wheelchair 10 may be different from an actual lateral acceleration. In some embodiments, the first turn parameter may differ from actual yaw rate of wheelchair 10 when one or more drive wheels lose traction during movement of the wheelchair. In some embodiments, the second turn parameter may differ from actual yaw rate of wheelchair 10 when one or more drive wheels lose traction during movement of the wheelchair. In some embodiments, the desired lateral acceleration of wheelchair 10 may differ from the actual lateral acceleration of wheelchair 10 when one or more drive wheels lose traction during movement of the wheelchair. In one embodiment, the first turn parameter and the second turn parameter both differ from an actual yaw rate. In some embodiments, the errors of the first turn parameter and the second turn parameter are of opposite polarity. For example, a first turn parameter may be greater than an actual turn rate of wheelchair and the second turn parameter may be less than an actual turn rate of the wheelchair. In one embodiment, the third turn parameter is an average of the first turn parameter and the second turn parameter. In one embodiment, the opposite polarity of the errors associated with the first turn parameter and the second turn parameter approximately cancel each other and a more accurate estimate of the true turn rate is determined when an average of the first turn parameter and the second turn parameter is determined by the controller 30. In one embodiment, the third turn parameter is different than at least one of the first turn parameter and the second turn parameter. In one embodiment, the controller 30 is adapted to determine a measured yaw rate signal. For example, the third turn parameter may be a measured, or computed, yaw rate signal 60 which is used in a stability control determination as explained in greater detail below. In one embodiment, at least one of the first turn parameter, the second turn parameter, and the third turn parameter are based on the caster angle ψ from one of the left and right caster wheels. In one embodiment, at least one of the first turn parameter, the second turn parameter, and the third turn parameter are based on and average caster angle ψ of the left and right caster wheels. In one embodiment, at least one of the first turn parameter, the second turn parameter, and the third turn parameter are determined separately for the caster angle ψ of each of the left and right caster wheels and the parameters are then average together. In one embodiment, the third turn parameter may be expressed as:

$$\omega = \frac{\left[\frac{\left|\frac{V_R + V_L}{2}\right|}{\left|L*\tan(\psi) + \frac{W}{2}\right|} * \text{sgn}[\tan(\psi)]\right] + \left[\sqrt{\frac{\left|\frac{V_R^2 - V_L^2}{2W}\right|}{\left|L*\tan(\psi) + \frac{W}{2}\right|}} * \text{sgn}[\tan(\psi)]\right]}{2}$$

In one embodiment, the stability control system includes a first module 57 (FIG. 8) adapted to maintain the wheelchair 10 on a selected direction of travel. For example, the controller 30 may compare a commanded yaw rate signal 62 (e.g., a signal generated by a user control device) to a computed yaw rate signal 60 (e.g., the third turn parameter). In one embodiment, such a comparison is indicative of a difference between a user desired parameter (e.g., speed and direction) and wheelchair performance. Substantially no difference may be an indication that the wheelchair is not undergoing a veer or wheel slip condition and is traveling along the path and at the rate intended by the user. A substantial difference may be indicative of veer or slip and a condition where the chair is not headed in a direction or at a speed desired by the user. In one embodiment, the controller 30 is adapted to determine a commanded yaw rate signal 62 from a joystick signal 66. For example, the joystick may output a signal in response to user manipulation wherein the signal is indicative of a commanded yaw rate. In one embodiment, the computed yaw rate signal 60 is related to the third turn parameter previously described. In one embodiment, the controller 30 is adapted to determine a yaw rate differential 64 by comparing the commanded yaw rate signal 62 to the computed yaw rate signal 60 and transmit a velocity signal to at least one of the left drive wheel 32 and the right drive wheel 34 based on a comparison between the yaw rate differential 64 and a selected threshold. In one embodiment, the velocity signal is a velocity correction signal adapted to adjust the rotational speed of at least one of the left drive wheel motor 24 and the right drive wheel motor 25. In one embodiment, there is no selected threshold and the controller 30 transmits a velocity signal when the yaw rate differential 64 is any difference between the commanded yaw rate signal 62 and the computed yaw rate signal 60. In one embodiment, a system that does not include a selected threshold provides smaller steering adjustments to the wheelchair with less abrupt steering changes than a system that has a selected threshold yaw rate differential.

In one embodiment, the yaw rate differential 64 is transformed (e.g., filtered, scaled, converted, proportional-integral-derivative (PID) block adjusted, and/or proportional-derivative (PD) block adjusted) prior to sending the velocity signal to at least one of the left drive wheel motor 24 and the right drive wheel motor 25. Other methods to modify the yaw rate differential can include linear quadratic estimation and/or predictive filtering techniques. For example, the controller 30 may cause an input of the yaw rate differential 64 into a PD block 68 together with constants based on wheelchair velocity, user weight and/or seat position profiles. In one embodiment, the PD block 68 does not include an integral component because the yaw rate differential 64 is not integrated over time. In one embodiment, a steering control system which includes the PD block 68 generates a steering correction signal more quickly than a system which includes a PID block because the PD block 68 is more responsive to relatively large and/or fast moving yaw rate differential signals.

In one embodiment, the scaled yaw rate signal 70 is adapted to overcome the inertia of the wheelchair when the wheelchair is moving. For example, as a movement parameter (e.g., velocity or acceleration) of the wheelchair increases it is effective to provide a greater scaled yaw rate signal 70 to the drive motors 24, 25 to adapt to the increased inertia required to correct the desired wheelchair trajectory. In one embodiment, the PD block 68 may determine a scaled yaw rate signal 70 based on the yaw rate differential 64 and PD block constants $K_p$ and $K_d$. In one embodiment, the controller includes a lookup table 72 including values for $K_p$ and $K_d$ depending upon the velocity of the wheelchair 10, driver weight, and/or seat position. In one embodiment, the $K_p$ and $K_d$ constant profiles are determined empirically and depend on the physical construction and dynamics of the wheelchair. In one embodiment, the $K_p$ value is proportional to the incoming yaw rate differential 64. In one embodiment, the $K_d$ constant is a derivative value related to the rate of change of the incoming yaw rate differential 64. In one embodiment, the method of determining the $K_p$ and $K_d$ values is selected from manual tuning, the Ziegler-Nichols method, the Tyreus Luyben method, the Cohen-Coon method, or the Astrom-Hagglund method. In one embodiment, the $K_p$ and $K_d$ values are dependent on the velocity of the wheelchair 10. For example, first $K_p$ and $K_d$ values may be provided when the wheelchair is travelling at a first velocity and second $K_p$ and $K_d$ values may be provided when the wheelchair is travelling at a second velocity. In one embodiment, the first velocity is less than the second velocity and the first $K_p$ and $K_d$ values are less than the first $K_p$ and $K_d$ values. In one embodiment, the second velocity is of greater magnitude than the first velocity. In one embodiment, the $K_p$ and $K_d$ values increase at the same wheelchair velocity value. In another embodiment, the $K_p$ and $K_d$ values increase at different velocities. In one embodiment, lower $K_p$ and $K_d$ values at a lower wheelchair velocity may reduce or eliminate motor "growling" which may result from higher $K_p$ and $K_d$ values.

In one embodiment, the controller 30 is adapted to determine a delta rotation signal 74. In one embodiment, the delta rotation 74 signal is a representation of the rotational speed of a motor that would generate a yaw rate equal to the scaled yaw rate differential 70. In one embodiment, the delta rotation signal 74 is used to modify the rotational rate of one or more of the drive motors 24, 25 based upon the scaled yaw rate differential 70 and, optionally, with one or more features of the wheelchair 10. For example, the delta rotation signal 74 may be determined from the scaled yaw rate 70 and one or more of the wheelchair width W, the gearbox ratio, and the diameter of each of the left drive wheel 16 and the right drive wheel 18. In one embodiment, the delta rotational signal 74 is related to a rotational speed by which one of the drive wheel motors 24, 25 could be adjusted such that the computed yaw rate signal 60 matches the commanded yaw rate signal 62. In one embodiment, the controller 30 is adapted to adjust the delta rotational signal 74 before sending the signal to one or more of the left drive wheel motor 24 and the right drive wheel motor 25. For example, the controller 30 may split the delta rotation signal 74 into a first delta rotation signal 76 and a second delta rotation signal 77. In one embodiment, the first and second delta rotation signals 76, 77 have a magnitude within is about 1%, about 2%, about 3%, about 4%, about 5%, about 6%, about 7%, about 8%, about 9%, or about 10% of each other. In one embodiment, the first and second delta rotation signals 76, 77 have opposite polarity. In one embodiment, the first and second delta rotation signals 76, 77 have the same magnitude but opposite polarity such that the overall speed of the wheelchair 10 is unaffected by the adjustment to the rotational speed of each of the left drive wheel motor 24 and the right drive wheel motor 25. In another embodiment, the delta rotation signal 74 may be sent to only one of the drive wheel motors 24, 25. In another embodiment, the motor rotational speed adjustment signals 76, 77 sent to drive wheel motors 24, 25 may have the same polarity and/or may not have the same magnitude.

In one embodiment, the controller 30 is adapted to determine a left adjusted rotational speed signal 80 and a right adjusted rotational speed signal 81 based upon the motor speed adjustment signal 76, 77 for each drive wheel motor 24, 25 and the desired rotational speed 78L, 78R of each of the left drive wheel motor 24 and the right drive wheel motor 25. In one embodiment, the desired rotational speed 78L of the left drive wheel motor 24 and the desired rotational speed 78R of the right drive wheel motor 25 is determined based upon the user manipulation of the joystick 66. For example, the controller 30 may be adapted to determine a desired motor rotational speed signal 78R, 78L for each of the left drive wheel motor 24 and the right drive wheel motor 25 based on the commanded yaw rate signal 62 and one or more of the wheelchair width W and length L.

In one embodiment, the left and right adjusted rotational speed signals 80, 81 adjust the rotational speed of the left drive wheel motor 24 and right drive wheel motor 25, respectively, which ultimately changes the rotational speed of the left and right drive wheels 16, 18 such that the computed yaw rate signal 60 and the commanded yaw rate signal 62 are within a selected range of each other. For example, the selected range may include the computed yaw rate signal 60 within about 1 degree/second, about 2 degrees/second, about 3 degrees/second, about 4 degrees/second, about 5 degrees/second, about 6 degrees/second, about 7 degrees/second, about 8 degrees/second, about 9 degrees/second, about 10 degrees/second, about 1 degree/second to about 3 degrees/second, about 2 degrees/second to about 4 degrees/second, about 3 degrees/second to about 5 degrees/second, about 4 degrees/second to about 7 degrees/second, or about 7 degrees/second to about 10 degrees/second of the commanded yaw rate signal 62. In one embodiment, the rotational speed adjustment signal increases the rotational rate of one the left drive wheel motor 24 and the right drive wheel motor 25 such that the rotational speed of one of the left drive wheel 16 and the right drive wheel 18 increases. In one embodiment, the rotational speed adjustment signal decreases the rotational rate of one of the left drive wheel motor and the right drive wheel motor 25. In another embodiment, the rotational speed adjustment signal increases the rotational rate of one, and decreases the rotational rate of the other of, the left drive wheel motor 24 and the right drive wheel motor 25.

Figure 9:
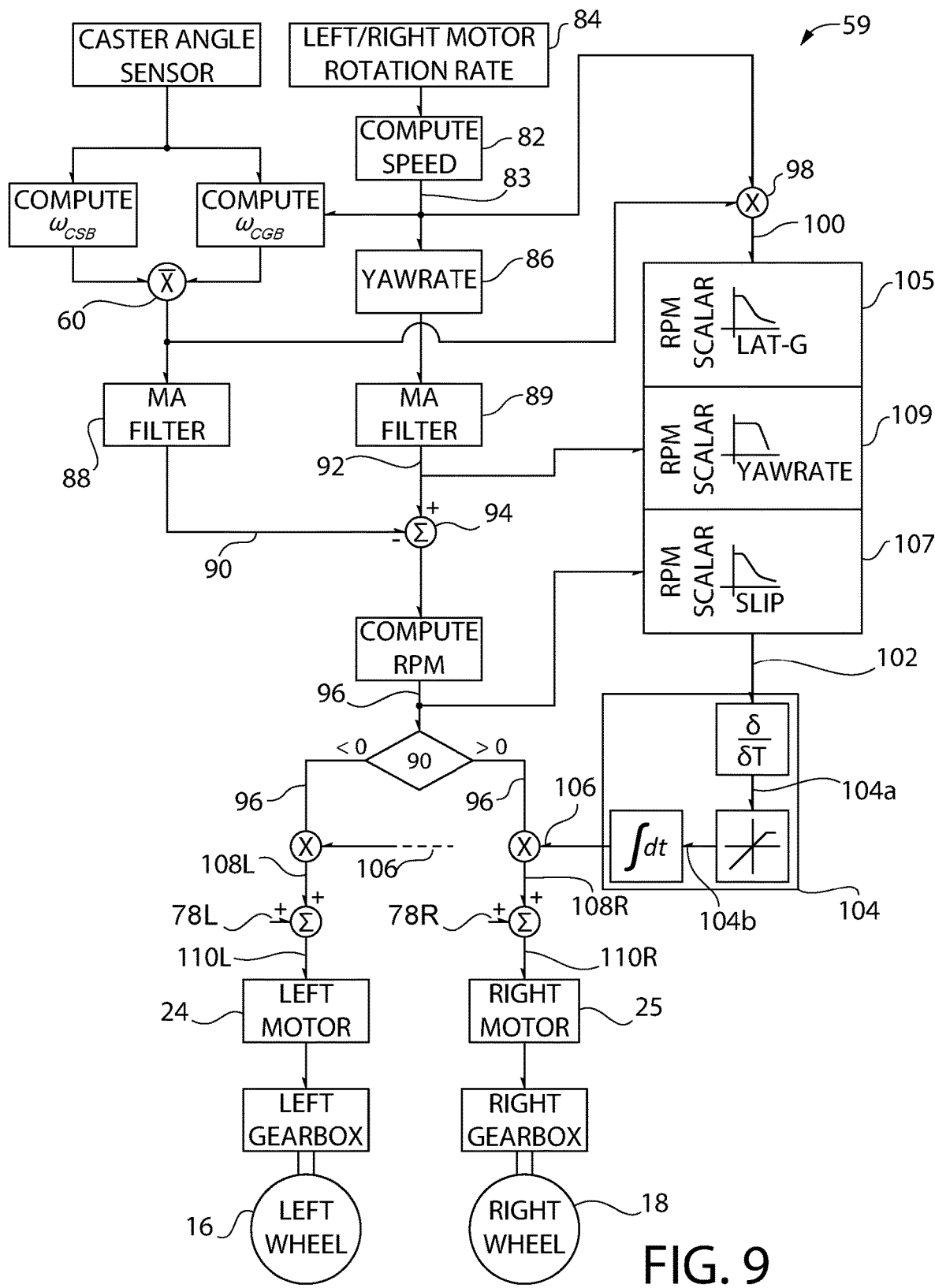
FIG. 9 is a flow chart of a second module in accordance with an exemplary embodiment of the present invention.

Turning now to FIG. 9, in one embodiment, the stability control system of the wheelchair 10 includes a second module 59 adapted to ensure that a desired yaw rate is within a selected range of the computed yaw rate. In one embodiment, the second module 59 is adapted to ensure that a wheel (e.g., an inside wheel) maintains traction when the wheelchair is turning. In one embodiment, the second module 59 is adapted to minimize the duration that a wheel (e.g., an inside wheel) loses traction when the wheelchair is turning. In one embodiment, the controller 30 is adapted to determine a calculated speed parameter 82 of the wheelchair 10 based on the drive wheel parameter 84 derived from the control sensor. For example, the controller may receive the drive wheel parameter 84 from one of the control sensors 32, 34 which is indicative of a rotational speed of the drive wheel motors 24, 25, which when taken into account along with at least one of the gearbox ratio and the drive wheel diameter, the calculated speed parameter 82 of the wheelchair 10 may be determined. In one embodiment, the controller 30 is adapted to determine the calculated speed parameter 82 based on the signal from the user input device 40. In one embodiment, the controller 30 is adapted to determine a commanded yaw rate signal 86 based on the calculated speed parameter 82 of the wheelchair 10. For example, the controller may determine the commanded yaw rate signal 86 based on the calculated speed parameter 82, the length L, and the width W of the wheelchair 10.

In one embodiment, the controller is adapted to apply a first filter 88 to the computed yaw rate signal 60. In one embodiment, the controller is adapted to apply a second filter 89 to the commanded yaw rate signal 86. In one embodiment, the filters 88 computed yaw rate and/or 89 are moving average filters. Other methods to modify the commanded yaw rate signal can include infinite impulse response (IIR), finite impulse response (FIR) or various block averaging types of filters. In one embodiment, the first filter 88 and/or the second filter 89 are lowpass structures adapted to smooth any transients occurring during parameter computation. In one embodiment, the filters 88, 89 reduce or eliminate the generation of any spurious jerking motion within the control loop compared to a system that does not include filters. In another embodiment, the stability control system does not include a filter.

In one embodiment, the controller is adapted to determine a yaw rate signal differential 94 by comparing a filtered computed yaw rate signal 90 to a filtered commanded yaw rate signal 92. In one embodiment, the controller 30 is configured to determine a parameter of one of the drive motors 24, 25 based on the yaw rate signal differential 94. For example, the controller 30 may utilize the yaw rate signal differential 94 along with one or more of the length L or width W of the wheelchair 10 and the drive wheel diameter to generate a rotational speed differential signal 96 related to a rotational speed of the drive wheel motor 24, 25 (e.g, revolutions per minute (RPM)).

In one embodiment, the controller 30 is adapted to determine a lateral acceleration parameter 98 and generate a lateral acceleration signal 100 related to the lateral acceleration parameter 98. For example, the controller 30 may determine the lateral acceleration parameter 98 based on a calculated speed signal 83 and the computed yaw rate signal 60. In one embodiment, the controller 30 is adapted to determine a scaled signal 102. In one embodiment, the scaled signal 102 is adapted to adjust the rotational speed of one of the left drive wheel motor 24 and the right drive wheel motor 25 based on a wheelchair deceleration curve.

In one embodiment, the scaled signal 102 is determined from the rotational speed differential signal 96 and a first value from a first wheelchair deceleration curve 105 based on the lateral acceleration signal 100. For example, the controller may determine the first value based on the lateral acceleration signal 100 by looking up the first value for the received lateral acceleration signal 100 in a lookup table or calculating the first value based on the received lateral acceleration signal 100. In one embodiment, the first value increases as the lateral acceleration signal 100 increases, thereby increasing deceleration of the wheelchair when the scaled signal 102 is sent to one of the drive wheel motors 24, 25. In one embodiment, quickly slowing the wheelchair at high levels of lateral acceleration helps to avoid or minimize wheelchair loss of traction and suppresses spinouts during aggressive commanded yaw rate control.

In one embodiment, the scaled signal 102 is determined from the rotational speed differential signal 96 and a second value from a second wheelchair deceleration curve 107. In one embodiment, the second wheelchair deceleration curve 107 is based on the rotational speed differential signal 96. In one embodiment, the second wheelchair deceleration curve 107 is related to an amount of calculated wheel slip. In one embodiment, slowing the wheelchair gradually at increasing levels of wheel slip helps to suppress further wheelchair loss of traction and avoid spinouts when driving on slippery surfaces under moderate to aggressive commanded turn rate control.

In one embodiment, the scaled signal 102 is determined from the rotational speed differential signal 96 and a third value from a third wheelchair deceleration curve 109. In one embodiment, the third wheelchair deceleration curve 109 is based on the filtered commanded yaw rate 92 of the wheelchair 10. In one embodiment, slowing the wheelchair quickly at high levels of commanded yaw rate reduces or minimizes inadvertent entering into aggressive pirouette spins (e.g., zero lateral acceleration spins). In one embodiment, each of the first wheelchair deceleration curve 105, the second wheelchair deceleration curve 107, and the third wheelchair deceleration curve 109 have a different profile. In one embodiment, the first value, second value, and third value from each of the first wheelchair deceleration curve 105, the second wheelchair deceleration curve 107, and the third wheelchair deceleration curve 109 are multiplied by a percentage and combined such that the scaled signal 102 does not exceed 100% of the values from the deceleration curves 105, 107, 109. In one embodiment, controller 30 utilizes only one of first deceleration curve 105, second deceleration curve 107 and third deceleration curve 109. In one embodiment, controller 30 utilizes only two of first deceleration curve 105, second deceleration curve 107 and third deceleration curve 109.

In one embodiment, the scaled signal 102 is transformed by the controller 30 (e.g., filtered, scaled, converted, proportional-integral-derivative (PID) loop, proportional-derivative (PD) loop) prior to the scaled signal 102 being received by one of the drive wheel motors 24, 25. For example, the scaled signal 102 may be input into an acceleration limiter 104. In one embodiment, the acceleration limiter 104 provides a maximum commanded acceleration (or deceleration) when the wheelchair starts to regain wheel traction. In one embodiment, the acceleration limiter 104 provides increased commanded control (e.g., it helps to avoid fishtailing) which could result if the deceleration curves 105, 107, 109 output a scaled signal 102 which would dramatically effect acceleration of the wheelchair 10.

In one embodiment, the scaled signal 102 is related to motor rotational velocity and the acceleration limiter 104 determines a derivative signal 104*a* (e.g., a derivative of the scaled signal 102). In one embodiment, the derivative signal 104*a* is related to the rate of change of the scaled signal 102 (e.g., a derivative of the motor rotational speed indicates an acceleration of the motor). In one embodiment, the acceleration limiter 104 determines an integral of a supplied signal 104*b*. In one embodiment, the supplied signal 104*b* is equal to the derivative signal 104*a*. In one embodiment, the acceleration limiter 104 provides a limit value as the supplied signal 104*b*. For example, the acceleration limiter 104 may substitute a limit value for the derivative signal 104*a* if the derivative signal 104*a* exceeds a selected threshold value. In one embodiment, acceleration is limited by the acceleration limiter 104 but deceleration is not limited. In one embodiment, the acceleration limiter 104 is adapted to determine a processed signal 106 (e.g., a rotational speed determined from the integral of the supplied signal 104*b*). In one embodiment, the controller 30 is adapted to send the processed signal 106 from the acceleration limiter 104 to one of the left front drive motor 24 and the right front drive motor 25.

In one embodiment, the processed signal 106 contributes to slowing down the rotational speed of at least one of the drive wheel motors 24, 25. For example, the controller 30 may be adapted to determine whether to send the signal 96 to the left drive wheel motor 24 or the right drive wheel motor 25 based on the filtered measured yaw rate signal 90. For example, if the filtered measured yaw rate signal 90 is above a threshold value (e.g., 0), then the signal may be sent to one of the drive wheel motors 24, 25 and if the filtered measured yaw rate signal 90 is below the threshold value the signal 96 may be sent to the other of the drive wheel motors 24, 25. In one embodiment, the controller 30 is adapted to determine a scaled rotational speed signal 108 based on the rotational speed differential signal 96 and the processed signal 106. For example, the controller 30 may scale the rotational speed differential signal 96 by an amount indicated by the processed signal 106 to determine a scaled rotational speed signal 108L for the left motor 24 and/or a scaled rotational speed signal 108R for the right motor 25. In one embodiment, the scaled rotational speed signal 108L/R is sent to only one of the left and right motors 24, 25 such that only one of the motors are decelerated.

In one embodiment, the controller 30 is adapted to determine an adjusted rotational speed signal 110L to be sent to the left drive wheel motor 24 and/or an adjusted rotational speed signal 110R to be sent to the right drive wheel motor 25. For example, the controller 30 may determine the adjusted rotational speed signal 110L/R by subtracting the scaled rotational speed signal 108L/R from the desired motor rotational speed signal 78L/R. In one embodiment, the rotational speed adjustment signal 110 is sent to one of the left drive wheel motor 24 and the right drive wheel motor 25 and the rotational speed of the motor is decelerated such that the velocity of the wheel attached to the motor slows and the measured yaw rate matches, or is within a selected range of, the commanded yaw rate.

Figure 10:
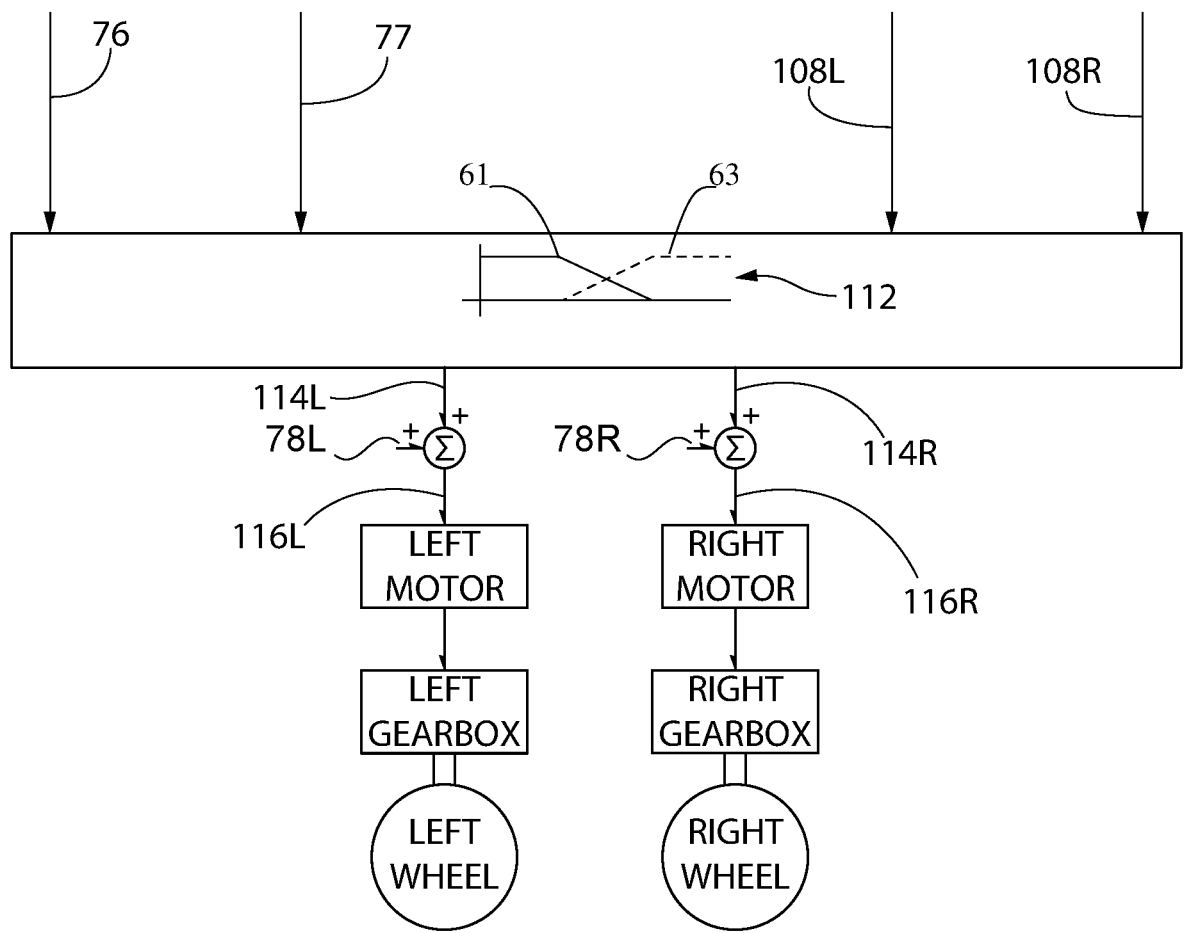
FIG. 10 is a flow chart combining the output of the first module of one embodiment of FIG. 8 and the second module of one embodiment of FIG. 9 in accordance with an exemplary embodiment of the present invention.

It may be desirable for the controller 30 to implement the first module 57 to keep the computed yaw rate within a selected range of the commanded yaw rate when the wheelchair 10 is operating in a first set of conditions. It may be desirable for the controller 30 to implement the second module 59 to keep the calculated yaw rate within a selected range of the commanded yaw rate when the wheelchair 10 is operating in a second set of conditions. It may also be desirable for the controller 30 to implement both the first module 57 and the second module 59 together or separately based on detected operation parameters. Turning now to FIG. 10, the stability control system may be adapted to determine when to implement the first module 57 and when to implement the second module 59 to keep the computed yaw rate within a selected range of the commanded yaw rate. In one embodiment, the controller 30 is adapted to determine whether to implement the first module 57, the second module 59 or a combination of the first module 57 and second module 59 based on the computed yaw rate. For example, the first module 57 may be applied exclusively when the wheelchair 10 is traveling at or up to a first threshold yaw rate. In one embodiment, a combination of the first module 57 and the second module 59 may be applied when the wheelchair is traveling between the first threshold yaw rate and a second threshold yaw rate. In one embodiment, the second module 59 may be applied exclusively when the wheelchair is travelling at a yaw rate above the second threshold. In one embodiment, the first threshold yaw rate is about 5 degrees per second, about 10 degrees per second, about 15 degrees per second, about 20 degrees per second, about 25 degrees per second, or about 30 degrees per second. In one embodiment, the second threshold yaw rate is about 35 degrees per second, about 40 degrees per second, about 50 degrees per second, about 55 degrees per second, about 60 degrees per second, about 60 degrees per second, about 65 degrees per second, about 70 degrees per second, or about 75 degrees per second. In one embodiment, the first module 57 and second module 59 are scaled by a percentage such that the total of the first module 57 influence and the second module 59 influence applied does not exceed a selected percentage (e.g., 75%, 100%, 125%, 150%). In one embodiment, the controller 30 includes a scale 112 which includes a first module scalar 61 to be combined with the output signal of the first module 57 and a second module scalar 63 to be combined with the output signal of the second module 59 as the yaw rate changes between the first threshold yaw rate and the second threshold yaw rate. In one embodiment, the first module scalar 61 decreases between the first threshold yaw rate and the second threshold yaw rate. In one embodiment, the second module scalar 63 increases between the first threshold yaw rate and the second threshold yaw rate.

In one embodiment, the controller is adapted to generate a combined motor speed adjustment signal 114L and/or 114R based on the scaled signal of each of the first module 57 and the second module 59. In one embodiment, the controller 30 determines the combined motor speed adjustment signal 114L for the left drive motor 24 by combining the left drive motor signal 76, as modified by the first module scalar 61, with the left scaled rotational speed signal 108L, as modified by the second module scalar 63. In one embodiment, the controller 30 determines the combined motor speed adjustment signal 114R for the right drive motor 25 by combining the right drive motor signal 77, as modified by the first module scalar 61, with the right scaled rotational speed signal 108R, as modified by the second module scalar 63.

In one embodiment, the controller 30 is adapted to determine an adjusted rotational speed signal 116 based on the combined motor speed adjustment signal 114L, 114 R and the desired motor rotational speed signal 78. For example, the controller may incorporate the combined motor speed adjustment signal 114L, 114R into the desired motor rotational speed signal 78 such that an adjusted motor rotational speed signal 116L, 116R is generated for each of the left drive motor 24 and the right drive motor 25. In one embodiment, the adjusted motor rotational speed signal 116L, 116R alters the velocity of at least one of the left drive wheel 16 and the right drive wheel 18 such that the commanded yaw rate matches, or is within a selected range of, the computed yaw rate. In one embodiment, the adjusted motor rotational speed signal 116L, 116R slows at least one of the drive motors 24, 25 by an amount related to the yaw rate differential and/or the computed yaw rate signal (e.g., a greater yaw rate differential and/or computed yaw rate signal results in greater slowing of at least one of the motors).

Caster wheels may spin quickly or 'whip' during an initial startup motion of the wheelchair from a stopped position if the casters are not aligned with the commanded wheelchair direction of travel. This whip effect may provide an inaccurate signal to the steering control system from the caster sensor 28. For example, the whipping motion may generate transients in the initial computed yaw rate signal 60. After moving for a short distance, the casters may align more closely with the desired caster angle and the accuracy of the computed yaw rate signal 60 increases. Thus, in one embodiment, the steering control system is not initiated until the wheelchair has traveled an onset distance. In some embodiments, the onset distance may be about 0.5 meter, about 1.0 meter, about 1.5 meter, about 2.0 meter or about 2.5 meter. In one embodiment, when the velocity of the wheelchair drops below a minimum amount, the delayed onset feature is engaged and the steering control system is not initiated again until the wheelchair has traveled the onset distance. In some embodiments, the minimum amount is about 0.2 kph, about 0.3 kph, about 0.4 kph, about 0.5 kph, about 0.6 kph, about 0.7 kph, about 0.8 kph, about 0.9 kph, or about 1.0 kph.

Figure 11:
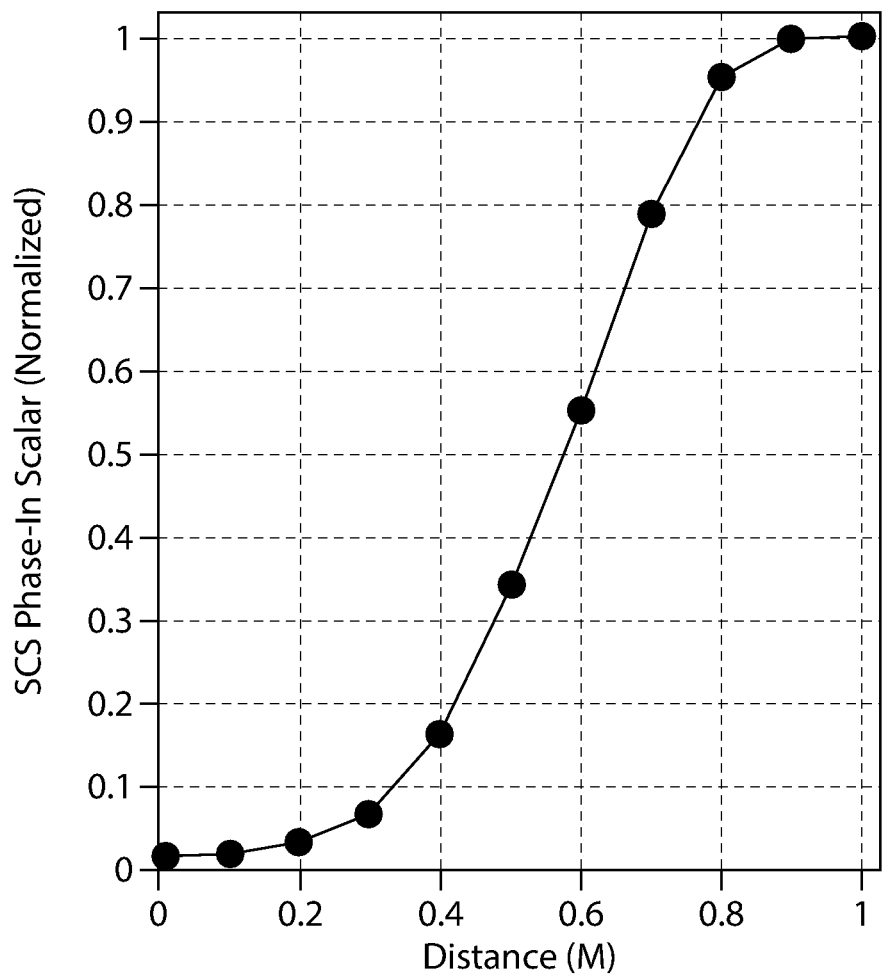
FIG. 11 is a graph showing a steering control system phase-in scalar in relation to distance in accordance with an exemplary embodiment of the present invention.
Figure 12:
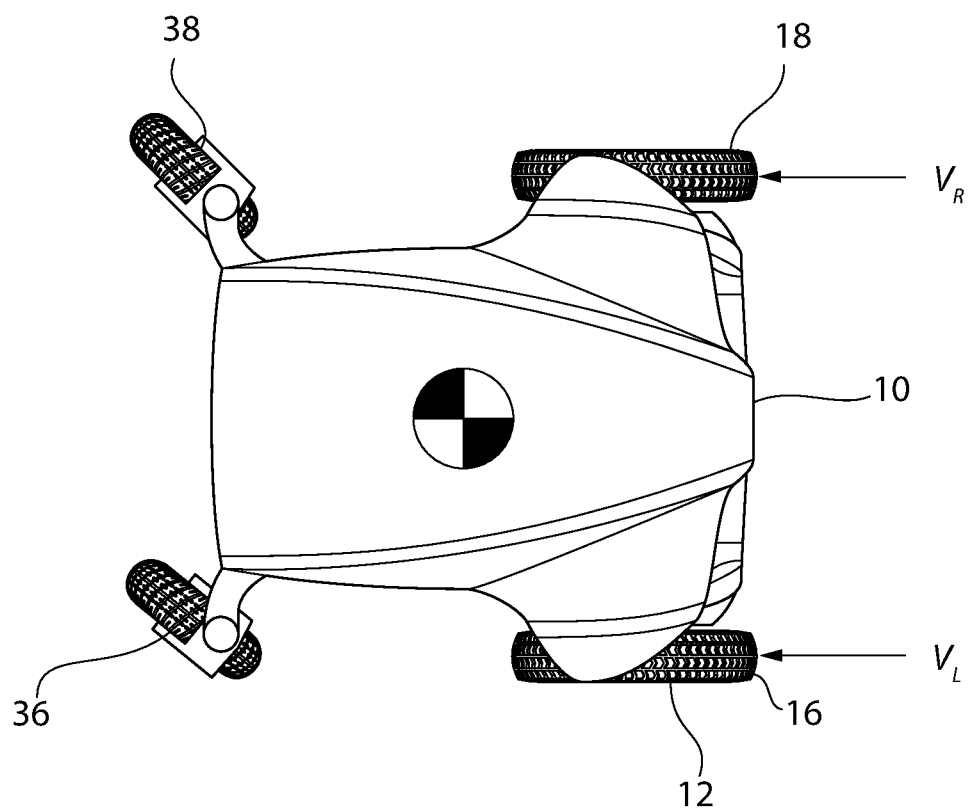
FIG. 12 is a top plan view of a wheelchair having a rear drive wheel in accordance with an exemplary embodiment of the present invention.

In one embodiment, the steering control system is not applied until after the wheelchair 10 travels the selected onset distance. In another embodiment, the steering control system is phased into effect as the wheelchair begins to move. FIG. 11 shows one example of a phase-in scalar of the steering control system. The effect of the steering control system is reduced when the wheelchair 10 first begins to move. The effect of the steering control system is scaled up until the wheelchair has traveled the full onset distance and the steering control system is fully implemented. In one embodiment, the controller 30 is adapted to phase-in the steering control system after each of the left drive wheel 16 and the right drive wheel 18 achieve a minimum rotation threshold (e.g., about 10 degrees per second, about 20 degrees per second, about 30 degrees per second, about 40 degrees per second, about 50 degrees per second, or about 60 degrees per second).

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. The words "inwardly" and "outwardly" refer to directions toward and away from, respectively, the geometric center of the DEVICE. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A wheelchair comprising:
    a drive wheel;
    a motor coupled to the drive wheel, the motor configured to rotate the drive wheel;
    an input device configured to send a signal for controlling a motor parameter;
    a caster wheel;
    a caster sensor configured to sense a caster angle; and
    a controller configured to receive the signal for controlling the motor parameter and a signal from the caster sensor and to determine a first turn rate parameter of the wheelchair based upon the received signal from each of the input device and the caster sensor.

2. The wheelchair of claim 1, wherein the motor parameter includes at least one of a motor current and a motor voltage.

3. The wheelchair of claim 2, wherein the controller is configured to determine a second turn rate parameter of the wheelchair that is different from the first turn rate parameter of the wheelchair.

4. The wheelchair of claim 3, wherein the second turn rate parameter is determined based upon a lateral acceleration parameter of the wheelchair and the received signal from the input device.

5. The wheelchair of claim 3, wherein the controller is configured to determine a third turn rate parameter of the wheelchair that is different from at least one of the first turn rate parameter and the second turn rate parameter.

6. The wheelchair of claim 5, wherein the third turn rate parameter is based upon the average of the first turn rate parameter and the second turn rate parameter.

7. The wheelchair of claim 5, wherein the first turn rate parameter is greater than a gyroscope-based turn rate parameter of the wheelchair.

8. The wheelchair of claim 5, wherein the second turn rate is less than a gyroscope-based turn rate parameter of the wheelchair.

9. The wheelchair of claim 5, wherein the drive wheel comprises a plurality of drive wheels including a left drive wheel and a right drive wheel, and
wherein the motor comprises a plurality of motors including a left motor coupled to the left drive wheel and a right motor coupled to the right drive wheel.

10. The wheelchair of claim 9, wherein the signal for controlling the motor parameter sent by the input device is a first signal for controlling a left motor parameter,
wherein the input device is configured to send a second signal for controlling a right motor parameter, and
wherein the controller is configured to receive the first signal and the second signal to determine the first turn rate parameter of the wheelchair based upon the received signal from each of the input device and the caster sensor.

11. The wheelchair of claim 10, wherein the controller is configured to send a signal to at least one of the left motor and the right motor to maintain a selected trajectory of the wheelchair if a difference between a commanded yaw rate signal and a computed yaw rate signal exceeds a selected threshold.

12. The wheelchair of claim 11, wherein the computed yaw rate signal is determined from at least one of the first turn rate parameter, the second turn rate parameter, and the third turn rate parameter.

13. The wheelchair of claim 11, wherein the commanded yaw rate signal is determined from at least one of the left motor parameter, the right motor parameter, and a width between the left drive wheel and the right drive wheel.

14. The wheelchair of claim 11, wherein the signal sent by the controller is configured to adjust at least one of the left motor parameter and the right motor parameter such that the commanded yaw rate and the measured yaw rate signal are within a selected range of each other.

15. The wheelchair of claim 11, wherein the signal sent by the controller is configured to increase one of the left motor parameter and the right motor parameter and the controller is configured to send a second signal configured to decrease the other of the left motor and the right motor parameter.

16. The wheelchair of claim 11, wherein the signal sent by the controller is configured to adjust at least one of the left motor parameter and the right motor parameter, and
wherein a wheelchair velocity along the selected trajectory remains within a selected range when the at least one of the left motor parameter and the right motor parameter is adjusted.

17. The wheelchair of claim 10, wherein the controller is configured to determine a yaw rate differential by comparing a commanded yaw rate signal to a computed yaw rate signal and to transmit a signal to one of the left motor and the right motor based on a comparison between the yaw rate differential and a selected threshold.

18. The wheelchair of claim 17, wherein the signal sent by the controller is processed to adjust a rotation speed of one of the left motor and the right motor.

19. The wheelchair of claim 17, wherein an inside wheel includes one of the left drive wheel and the right drive wheel and an outside wheel includes the other of the left drive wheel and the right drive wheel, and
wherein the controller is configured to transmit the signal to one of the inside wheel and the outside wheel,
wherein the signal is processed to reduce a velocity of one of the inside wheel and the outside wheel to compensate for slippage when the wheelchair is turning.

20. The wheelchair of claim 19, wherein the signal transmitted from the controller is configured to reduce the velocity of one of the inside wheel and the outside wheel by an amount related to the yaw rate differential.

21. The wheelchair of claim 19, wherein the velocity of one of the inside wheel and the outside wheel is reduced by an amount related to the computed yaw rate signal.

22. The wheelchair of claim 10, wherein the controller is configured to transmit a first signal to at least one of the left motor and the right motor to maintain a selected trajectory of the wheelchair when a yaw rate is within a first range of yaw rates, and
wherein the controller is configured to transmit a second signal to at least one of the left motor and the right motor when the yaw rate is within a second range of yaw rates, and
wherein the first range is lower than the second range.

23. The wheelchair of claim 22, wherein the controller is configured to transition between transmitting the first signal and transmitting the second signal starting at a yaw rate of about twenty degrees per second to a yaw rate of about sixty degrees per second.

24. The wheelchair of claim 22, wherein the yaw rate includes at least one of a commanded yaw rate, a measured yaw rate, and a yaw rate differential.

25. The wheelchair of claim 1, wherein the drive wheel is a front drive wheel.

26. The wheelchair of claim 1, wherein the drive wheel is a rear drive wheel.

27. The wheelchair of claim 1, wherein a sensitivity of the controller to the signal from the user input device decreases as a rotational speed of the motor increases.

* * * * *